United States Patent [19]
Konishi et al.

[11] Patent Number: 5,393,962
[45] Date of Patent: Feb. 28, 1995

[54] IMAGE STORING METHOD AND APPARATUS INCLUDING DETECTING INDEX INFORMATION INCLUDED IN IMAGE INFORMATION READ OUT FROM A RECORDING MEDIUM

[75] Inventors: Motofumi Konishi, Yokohama; Shigeru Sugita, Tokyo; Takashi Naba, Kawasaki; Masami Amemiya, Tokyo, all of Japan

[73] Assignee: Canon Kabushiki Kaisha, Japan

[21] Appl. No.: 53,563

[22] Filed: Apr. 28, 1993

Related U.S. Application Data

[62] Division of Ser. No. 702,006, May 17, 1991, Pat. No. 5,237,156.

[30] Foreign Application Priority Data

May 17, 1990 [JP] Japan ................................ 2-127623
May 17, 1990 [JP] Japan ................................ 2-127624
May 16, 1991 [JP] Japan ................................ 3-111760

[51] Int. Cl.$^6$ ........................................... G06F 15/20
[52] U.S. Cl. ..................................... 235/375; 235/454
[58] Field of Search ............... 235/375, 378; 355/40; 364/518

[56] References Cited

U.S. PATENT DOCUMENTS

| | | | |
|---|---|---|---|
| 4,283,621 | 8/1981 | Pembroke | 235/375 |
| 4,914,471 | 4/1990 | Saeki et al. | 355/40 |
| 4,964,066 | 10/1990 | Yamane et al. | 364/518 |
| 4,972,068 | 11/1990 | Ohtani et al. | 235/375 |
| 5,039,847 | 8/1991 | Morii et al. | 235/379 |

*Primary Examiner*—Harold Pitts
*Attorney, Agent, or Firm*—Fitzpatrick, Cella, Harper & Scinto

[57] ABSTRACT

An image registering method and apparatus for recording an image in a recording medium include reading an image of an original to which a bar code is added, storing the read image of the original in a memory, rotating the image stored in the memory by 90 degrees, detecting the bar code from the image, which has been rotated, and decoding detected bar code information and forming an index file indicating a relationship between the decoded bar code information and a recording address of the image of the original, which is recorded in the recording medium.

20 Claims, 25 Drawing Sheets

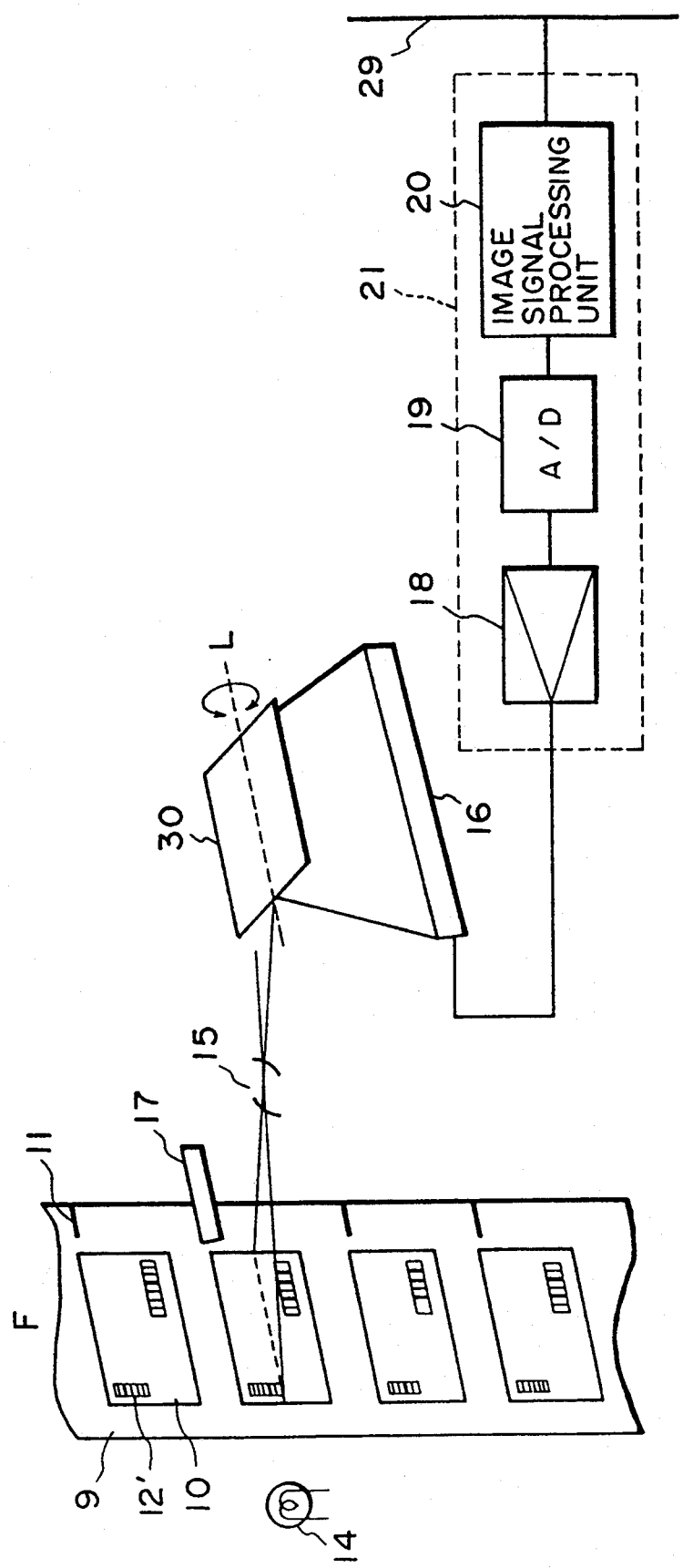
F I G. 6

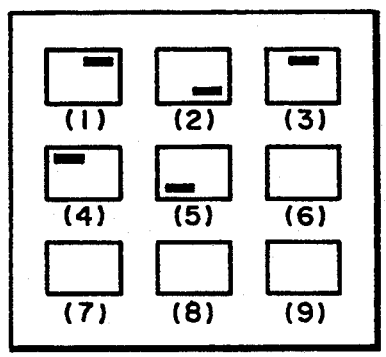
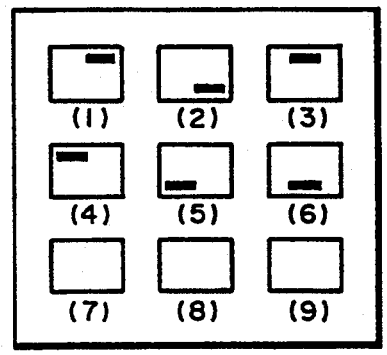
FIG. 10A  FIG. 10B
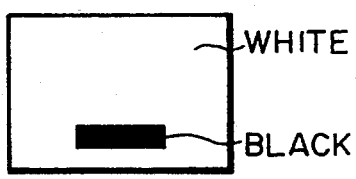
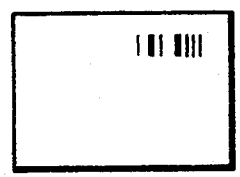
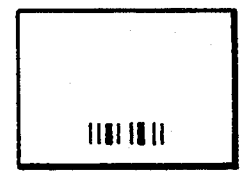
FIG. 11   FIG. 12A   FIG. 12B

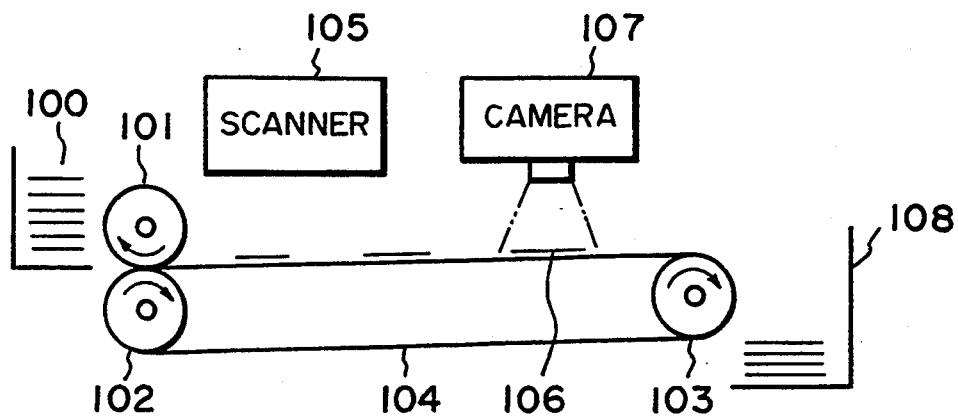
FIG. 27
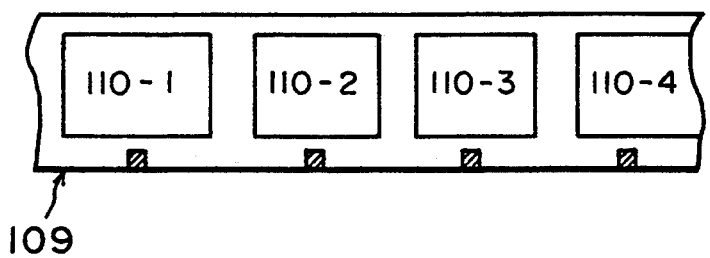
FIG. 28A
| FRAME NUMBER | INDEX |
|---|---|
| 101 | 123456 |
| 102 | 246789 |
| 103 | 000694 |
| 104 | 524123 |
FIG. 28B

IMAGE STORING METHOD AND APPARATUS INCLUDING DETECTING INDEX INFORMATION INCLUDED IN IMAGE INFORMATION READ OUT FROM A RECORDING MEDIUM

This application is a divisional of prior application Ser. No. 07/702,006, filed May 17, 1991, now U.S. Pat. No. 5,237,156, Aug. 17, 1993.

BACKGROUND OF THE INVENTION

1. Field of the Invention

This invention Palates to an apparatus for registering images on a storage medium and, in particular, to a method of entering index information on the registered images in such an apparatus.

2. Related Background Art

To preserve storage space for documents, etc., produced in great quantities, it has conventionally been the practice to store the image information contained therein on microfilms, magnetic/opto-magnetic discs, etc.

From the viewpoint of information management, it is necessary to enter an index corresponding to the items of information thus stored so that the information may be easily accessed (retrieved) later on. Conventionally, the operation of preparing such an index has required an enormous amount of time.

As a means of avoiding this problem, a system is known, according to which code information serving as an index is imparted to the documents stored. The code information is read by a scanner, with the documents being photographed at the same time.

The scanner used may, for example, be a bar code scanner for reading bar codes, an MICR for reading magnetic characters, or an OCR for reading ordinary characters.

FIG. 27 is a block diagram showing a simple example of an apparatus to which the above conventional method is applied.

In this apparatus, original sheets 100, each equipped with a bar code as index information, are conveyed by a feeding means consisting of rollers 101,102 and 103 and a belt 104 toward a discharge tray 108. The above index information is read by a bar code scanner 105, and the image of an original sheet which has reached a photographing section 106 is photographed by a camera 107 so as to be recorded on a microfilm.

The index information thus read is transferred to a computer.

As shown in FIGS. 28A and 28B, the index information is recorded on the computer memory in such a manner that the items of index information respectively representing the original sheets have a one to one correspondence to the numbers of frames 110 of a microfilm 109. By using the index data thus recorded on the memory, a desired image frame in the microfilm can be easily and definitely retrieved later on.

An example of a conventional device of this type is disclosed in U.S. Pat. No. 4,283,621.

Apart from the above example, an electronic filing apparatus which employs a CCD as the image reading device for the photographing section and an optical disc as the recording device has recently been attracting attention.

FIG. 29 is a block diagram showing a simple example of an apparatus using an optical disc.

In this apparatus, a bar code 111, imparted to a text 110, is read by a pen-type scanner 112. The bar code data thus read is displayed on a display terminal 115 equipped with a keyboard. If the bar code proves unreadable, the data contained therein is manually entered at the display terminal 115.

Then, an image scanner 113 reads the image of the document. The image information thus reed is stored in a memory 114 and, at the same time, displayed on the display terminal 115. The index information, which has been read be the scanner 112 or manually entered, is simultaneously displayed on this display.

The operator verifies the displayed data and depresses a "verification" key, thereby causing 8 predetermined image processing operation (such as edge emphasis or data compression) to be performed in a processing circuit 116, and thus the image data and the index data are recorded on an optical disc 117.

In another construction, the recording of the data is effected separately; e.g., the image data is recorded on the optical disc, and the index data is recorded on some other recording medium (e.g., a floppy disc).

By using this index data, a desired image can be easily and definitely retrieved out of the optical disc later on.

A problem with the above prior-art techniques is that the speed of the entire data processing depends on the speed of the paper handling operations, including the reading of bar codes. Thus, a substantial improvement in the data processing capacity for original texts cannot be expected even if the image scanning speed is increased. Accordingly, the above prior-art techniques are not suited for mass data processing.

Further, in a case when original texts can be conveyed successively, any error in code reading causes the system operation to be interrupted, necessitating restoring (re-inputting) by the operator. Thus, the operator has to constantly keep an eye on the apparatus.

Determination as to whether or not the data obtained through bar code reading by the scanner is correct can be made with an improved level of reliability by adopting one of the following methods:

(1) Scanning a bar code two or more times, the data being regarded as correct when scanning results agree with each other;

(2) Scanning a bar code three or more times, the data being regarded as correct when the results of two consecutive scannings agree with each other; and (3) Scanning a bar code three or more times, the data being determined on the basis of majority logic.

With most high speed scanners, however, data is determined with a single scanning, resulting in a rather low level of reliability or correctness in data reading.

Thus, with conventional scanners, a satisfactory level of reliability in data reading cannot be expected in the case of high speed data processing. A satisfactory level of reliability can not be attained without decreasing the processing speed.

SUMMARY OF THE INVENTION

It is an object of this invention to provide an image registering apparatus in which the above problems are eliminated.

Another object of this invention is to provide an apparatus for and a method of image registration wherein the step of registering on a recording medium the image of an original equipped with index information in the form of a bar code or the like and the seep of preparing an index file indicating the correspondence of the index information to the address of the image, are performed in different time ranges, whereby the registration of the image and the preparation of the index file can be performed efficiently.

Still another object of this invention is to provide an apparatus for and a method of image registration wherein, when the image of an original equipped with index information in the form of a bar code or the like is being registered on a recording medium, the position of the index information is indicated beforehand, whereby the index information can be read easily and efficiently.

A further object of this invention is to provide an apparatus for and a method of image registration wherein the reading of the image of an original equipped with index information in the form of a bar code or the like and the entering of information indicative of the position of the index information are effected simultaneously, thereby achieving an improvement in terms of operability.

Other objects of this invention will become apparent from the following description when reference is also made to the accompanying drawings and the attached claims.

BRIEF DESCRIPTION OF THE DRAWINGS

FIG. 6 is a block diagram showing, in three dimensions, the microfilm scanner section of the second embodiment;

FIGS. 10A and 10B are diagrams showing examples of partition paper display;

FIG. 11 shows a partition paper;

FIGS. 12A and 12B are diagrams showing originals equipped with a bar code;

FIG. 27 shows the construction of a conventional image registering apparatus;

FIG. 28A shows a microfilm;

FIG. 28B shows an index file configuration; and

DETAILED DESCRIPTION OF THE PREFERRED EMBODIMENTS

Figure 1:
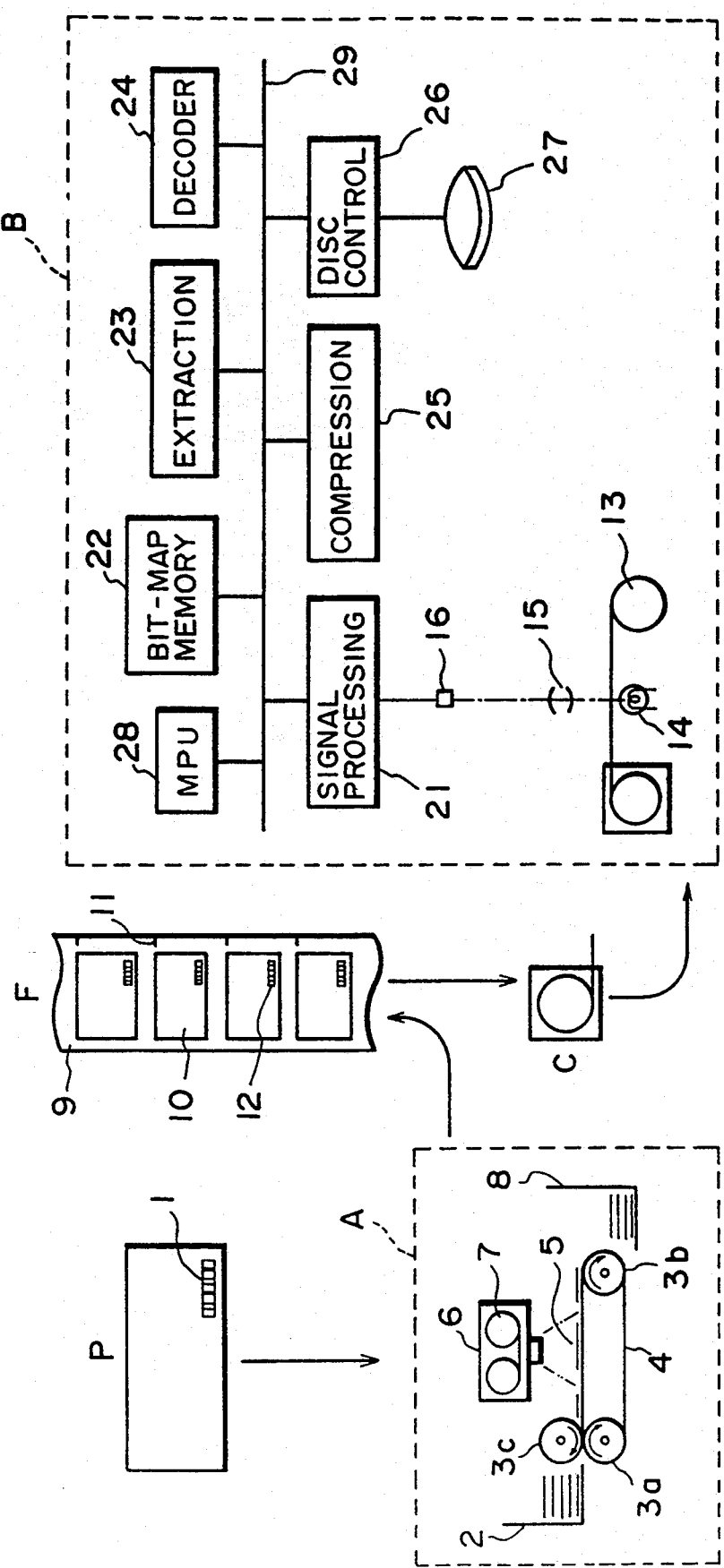
FIG. 1 is a block diagram showing an image recording system in accordance with a first embodiment of the present invention.

FIG. 1 is a block diagram showing the construction of an image registering apparatus in accordance with the first embodiment of this invention.

Basically, the system is composed of a photographing section A for recording originals on microfilms and a reading section B for reading codes from microfilms.

In FIG. 1, an original sheet P is equipped with code information 1 (in the form, for example, of a bar code).

A paper feeding section 2 in which original sheets P are stacked is provided in the photographing section A. Arranged adjacent to the paper feeding section 2 is a feeding means 5 for feeding the paper sheets P in the paper feeding section 2 one by one starting with the one at the bottom. This feeding means consists of rollers 3a and 3b, a belt 4 stretched therebetween, and a (reversing) roller 3c which is in touch with the roller 3a.

Arranged above this feeding means is a photographing camera 6 serving as the recording means, by means of which the original sheets P in the photographing section 5 are recorded on a microfilm 7. Provided on the downstream side in the feeding direction of the feeding means is a paper discharge stacker 8 in which original sheets P already photographed are placed.

A microfilm which has undergone the processes of photographing and development is shown at F in FIG. 1. Recorded on this microfilm are reduced images (frames) 10 of the originals P and marks 11 called blips for specifying the image positions. Naturally, the code information 1 is also recorded as part of the reduced images 10.

To enable the after-treatment to be carried out as unattended as possible, the microfilm which has undergone the processes of photographing and development is loaded on a cartridge, as shown at C in the drawing. The microfilm loaded on the cartridge is then set in the medium change section B.

The medium change section B is composed of a film feeding means, a film image reading means, a decoding means, and an image recording means.

The microfilm feeding means is composed of a roller (not shown) for feeding the microfilm 9, a glass platen (not shown), a take-up reel 13 for taking up the film, etc.

The microfilm image reading means is composed of a light source 14 for irradiating the microfilm 9, a condenser lens (not shown), a projection lens 15, an image reading device 16, a signal processing circuit 16, a bit-map memory 22, etc.

The decoding means is composed of a data extraction circuit 23 and a decoder 24. The image recording means is composed of an image data compression circuit 25, a disc control circuit 26, and a disc 27.

The entire system is controlled by a microcomputer 28.

The circuits 21 through 28, exclusive of the disc 27, are connected to a bus line 29.

Figure 2:
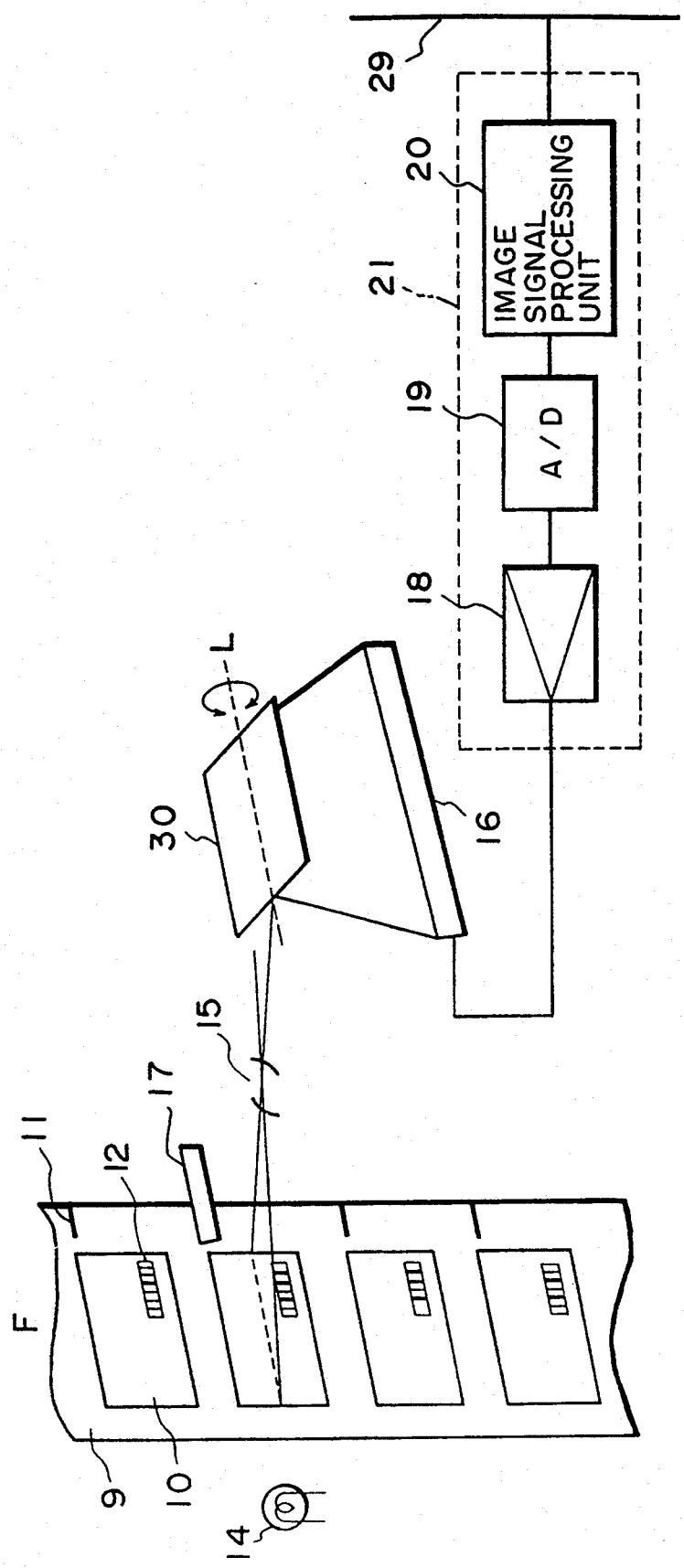
FIG. 2 is a block diagram showing, in three dimensions, the microfilm scanner section of the first embodiment.

FIG. 2 is a block diagram showing, in three dimensions, the microfilm scanner section in the above medium change section B.

In this medium change section B, a sensor 17 detects the blip marks 11 on the microfilm 9. These marks are counted successively, the film being fed until a count number corresponding to a desired image 10 is attained.

When a count number 10 corresponding to a desired image has been attained, the feeding of the microfilm 9 is stopped. A rotary reflecting mirror 30 continues to rotate around an axis of rotation L (indicated by the broken line) until the upper end of an image 10 is projected onto the image reading device 16. Subsequently, the reflecting mirror 30 rotates in the reverse direction to scan the image 10.

An analog image signal from the scanned image 10 is amplified by an amplifier 18 and converted by an A/D converter 19 to a digital signal, which undergoes image processing procedures such as edge emphasis in an image signal processing unit 20 and is transmitted to the bus line 29. These processes are performed substantially in synchronism with the angular velocity of rotation of the rotary reflecting mirror 30.

While in this embodiment the sub-scanning of the image. 10 is performed with a single rotary mirror 30, this should not be construed as restrictive. There are, for example, a number of other methods available in which two mirrors are used in combination.

Then, output signals from the image reading device 16 are stored in the bit-map memory 22. These signals are also transmitted to the data extraction circuit 23.

When it detects among the digital signals of one line a signal which appears to be a bar code signal, the data extraction circuit 23 transmits the signals corresponding to the period starting from the time to the rear end of the one line to the bar code decoder 22, where signal analysis is performed. By "a signal which appears to be a bar code signal" is meant a signal having the pattern of white-run/black-run/white-run, with the first white run being at least three times the size of the black run. If this condition is satisfied, the above black run is regarded as the reference in length, and decoding for one character is performed in accordance with a predetermined rule. If the decoding is successful, it is further continued. If not, the above operations of detecting a signal which appears to be a bar code signal and decoding the same are performed again, repeating these operations until the rear end of the line is reached. These operations are repeated for each line, and, when the same data has been detected a predetermined number of times, it is kept as reading data. When the reading for one microfilm, frame has been completed, data is read for each line from the bit-map memory 22 and compressed by the data compression circuit 25 in accordance with a predetermined rule, the compressed data being recorded on the disc 27. Further, substantially at the same time, the data kept in the decoder 24 is also recorded on the disc 27 as index data.

Assuming, for example, in the case of a standard bar code with a narrow bar size of 0.3 mm, a frequency which is two times higher than the narrow bar frequency (1 mm÷0.3 mm) is set taking into account the image deterioration due to the microfilm, $$1 \text{ mm} \div 0.3 \text{ mm} \times 2 = 6.67 \text{ pel}$$

By considering this in the light of the well-known sampling theorem, the bar code can be read with accuracy at a sampling frequency which is two times higher than 6.67 pel.

Thus, it will be seen that, in this example, the reading of code information from microfilm images is fully possible by using an image sensor with a resolution of approximately 16 pel/mm.

Figure 3:
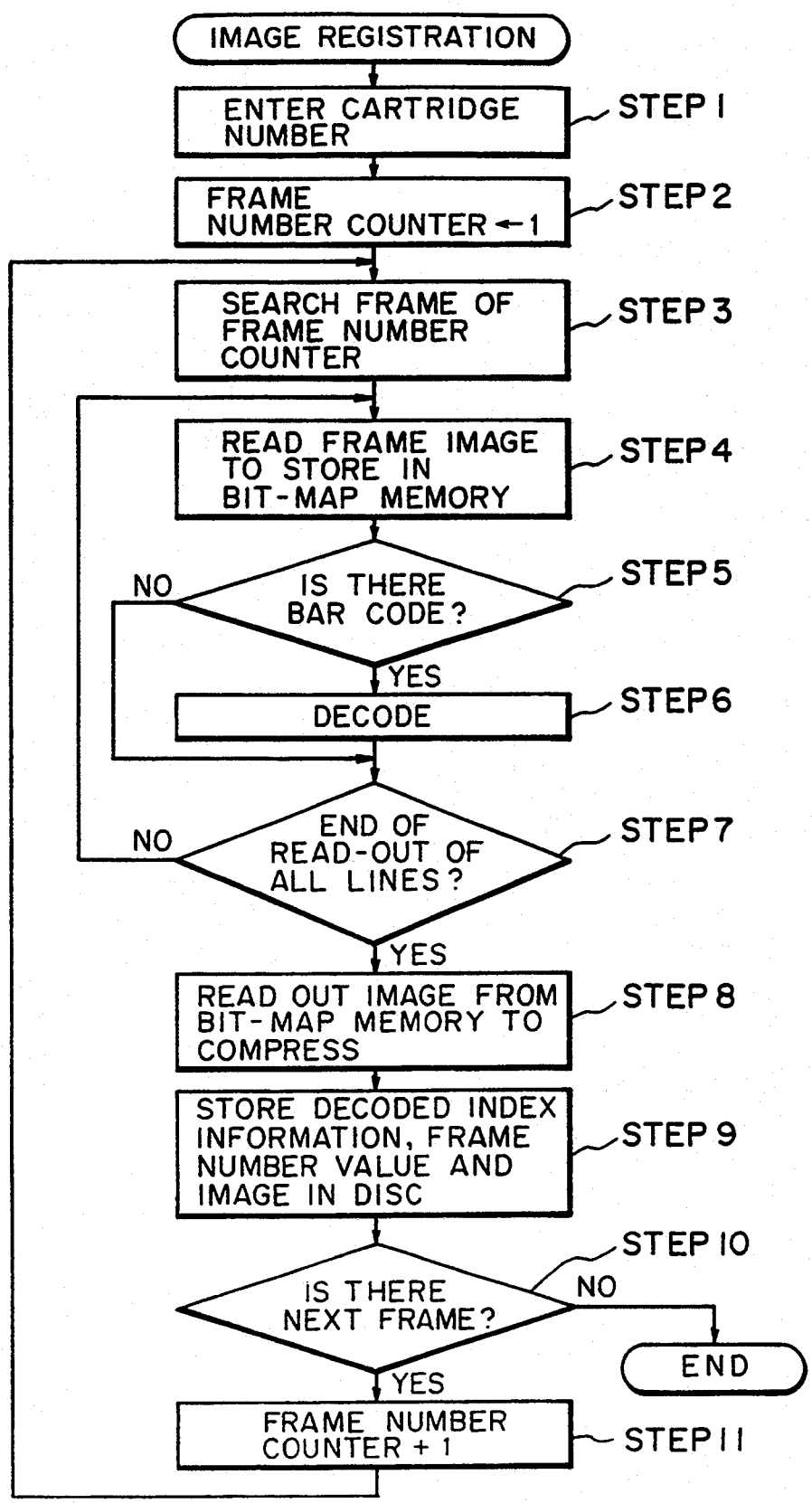
FIG. 3 is a flowchart showing the image registering operation in the first embodiment.

FIG. 3 illustrates the above image registering operation.

First, a cartridge number to identify the cartridge is entered (Step 1), end a frame number counter for identifying, microfilm frames is set to 1 (Step 2). Then, the frame corresponding to the value of the, frame number counter is Searched for and is stopped at the reading position (Step 3). The lamp 14 is lighted up end, while rotating the mirror 30, the frame image is read by the line and stored in the bit-map memory 22 and, at the same time, transmitted to the extraction circuit 23 (Step 4). The extraction circuit 23 makes a judgment as to whether a bar code pattern is contained in one line data or not (Step 5). If there is a bar code pattern, the data from that time onward is transmitted to the decoder 24, where it is analyzed (Step 6). Then, the reading is repeated until the images of all the frame image lines have been read (Step 7). Afterwards, the images stored in the bit-map memory 22 are read out line by line, compressed in the compression circuit 25 (Step 8), and stored in the optical disc 27 through the disc control unit 26 (Step 9). Then, data Indicating the relationship between the index information analyzed by the decoder 24 and the frame number is stored on the disc 27 as an index file. When the registration of one-frame image has been completed, it is judged from the blip marks, etc. whether there is a next frame or not (Step 10). If there is, the frame number counter is incremented by one (Step 11), repeating the retrieval, reading, etc. of the next frame.

While in this embodiment the codes added to the documents are bar codes, this should not be construed as restrictive. This embodiment also is applicable, substantially in the same way, to a case where the codes are represented by characters. In that case however, it is difficult to extract such a character code out of the document, so that the place where the characters are recorded is determined beforehand, the above extraction circuit transmitting the data recorded on the place to the decoder (OCR).

Figure 4A:
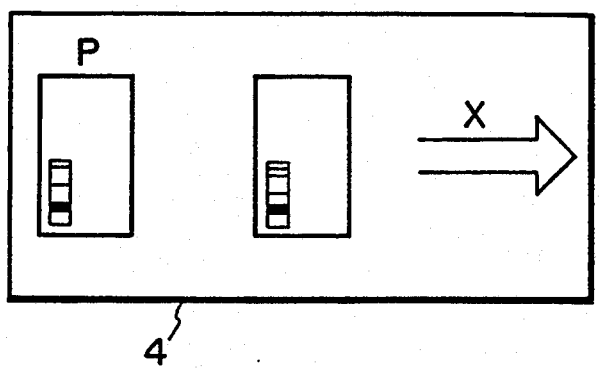
FIGS. 4A and 4B are schematic diagrams showing the relationship between the direction in which the microfilm is fed and the direction in which the bar code are arranged.

FIGS. 4A end 4B are schematic diagrams showing the relationship between the direction in which the microfilm is fed and the direction in which the bar codes are lined up.

The drawings show how original sheets are conveyed by the belt 4 to the photographing section 5, the arrow X indicating the conveying direction. In the example shown in FIG. 4A, which constitutes the first embodiment, it is slips, and, in the example shown in FIG. 4B, it is A4 size documents, that are conveyed.

Figure 4B:
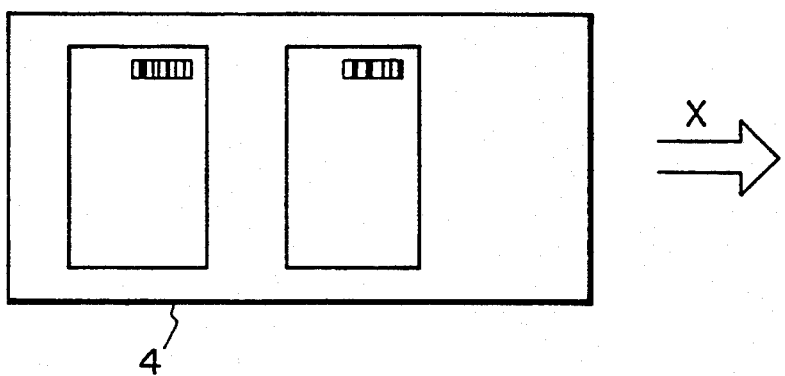

In the condition shown in FIG. 4B, the direction in which the bar codes are lined up is perpendicular to the scanning direction, so that the bar codes cannot be read.

This problem is eliminated in the second embodiment of the present invention.

Figure 5:
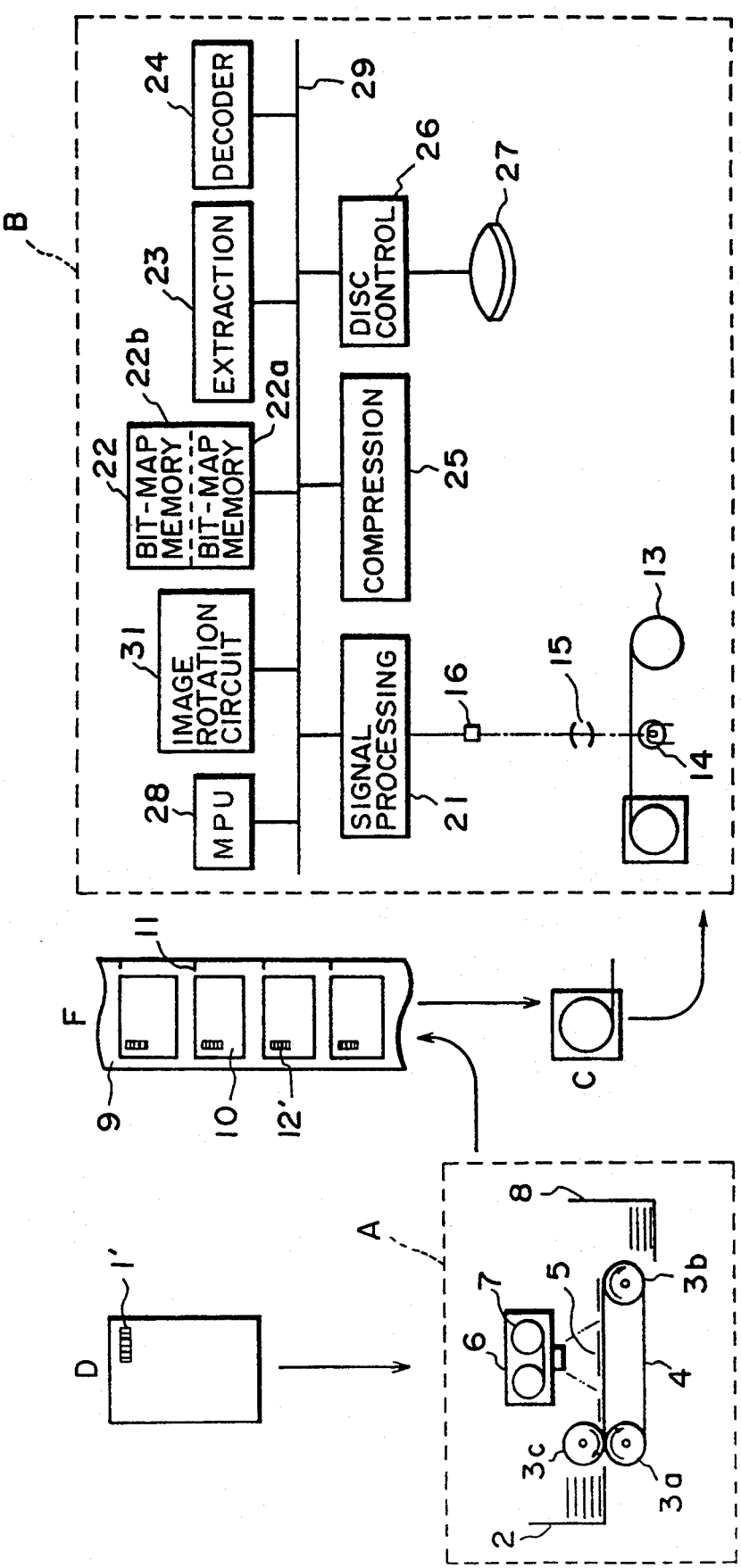
FIG. 5 is a block diagram showing an image recording system in accordance with a second embodiment of the present invention.

FIG. 5 is a block diagram showing an image recording system in accordance with the second embodiment, and FIG. 6 is a block diagram showing, in three dimensions, the microfilm scanner section in the second embodiment.

Since the second embodiment is similar to the first one, the following description will only be with respect to the differences therebetween.

If the bar codes are lined up perpendicular to the original conveying direction, the film prepared is such as indicated at F in FIG. 5.

In this condition, the bar codes on this film cannot be decoded since they are lined up perpendicular to the scanning direction. Thus, in the second embodiment, the image data of a document is read and subjected to image processing, and then stored in the bit-map memory 22a. Afterwards, the image data is rotated on the bit-map memory.

The rotation of the image data can be expressed by the following formulae:

$$Y = \cos A \cdot y - \sin A \cdot x$$

$$X = \sin A \cdot y + \cos A \cdot x$$

In particular, in the case of a 90° rotation, $$Y = -x, x = y$$

Image signals which have been subjected to the rotation scanning are stored in the bit-map memory 22b, from which they are transmitted line by line to the decoder 24, where they are analyzed. At the same time, the signals are transmitted to the compression circuit 25.

Afterwards, processes similar to those of the first embodiment are performed.

It is desirable that the decision as to whether to use the signals before the vertical/horizontal conversion or those thereafter as the image data be made in accordance with the direction in which the original can be observed in the normal direction.

Further, it is also possible, in the second embodiment, to perform decoding without rotation scanning, performing, if index data is obtained, an operation similar to that of the first embodiment, and, if no index data is obtained, an operation similar to that of the second embodiment, on the contents of the bit-map memory 22a; if still no data is obtained, a "no bar code" operation may be performed. In this way, data processing can be performed on originals consisting of a mixture of slips and documents.

While in the first and second embodiments the image information and the code data are recorded on the same recording medium, they may also be recorded on separate media. When recording large quantities of image data, for example, a plurality of discs are required. In such a case it is desirable that the code data as the index data be recorded on a different medium from that for the image data so that an overall view of data may be obtained.

Thus, documents/slips produced in great quantities are first photographed at high speed so as to be recorded on a microfilm and then transferred to a medium like an optical disc, thereby attaining a substantial rationalization through high speed photographing and unmanned medium change.

Further, it is possible to construct a more ideal document management system in which data is stored on microfilms and extracted for use out of optical discs or the like. Further, this system can be effectively applied to a case where only index files are prepared and where the data transfer onto optical discs or the like is not performed.

In the above embodiments, an original document is first photographed so as to be recorded on a microfilm and is then stored on an optical disc. In the method described below, in contrast, the original document is directly stored on an optical disc.

Figure 7:
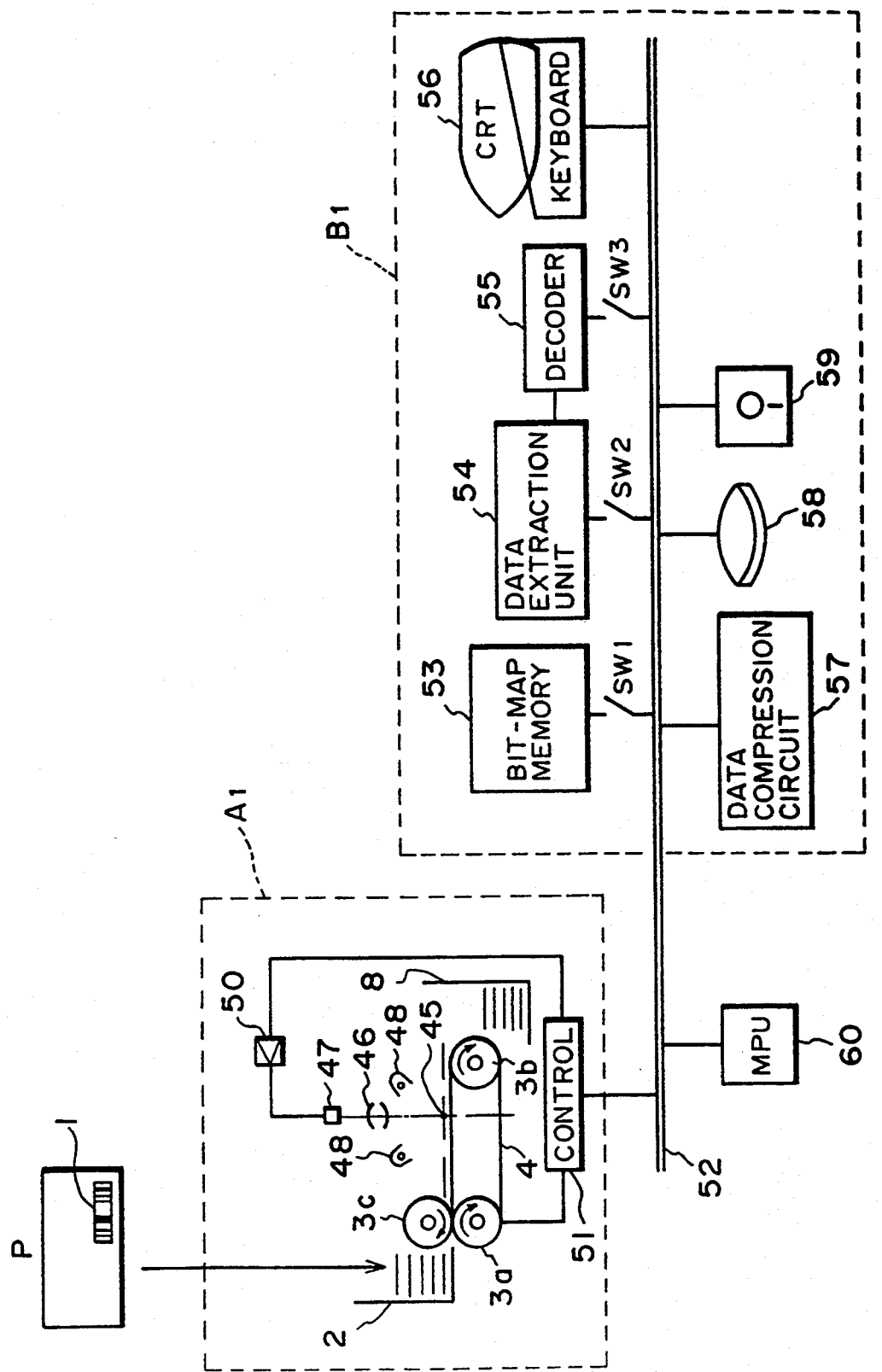
FIG. 7 is a block diagram showing an image recording system in accordance with a third embodiment of the present invention.

FIG. 7 is a block diagram showing an image recording system in accordance with the third embodiment of the present invention.

Basically, the system is composed of a scanning section $A_1$ for electronically reading originals and a data-processing/control unit $B_1$.

Provided in the scanning section $A_1$ is a paper feeding section 2, in which original sheets P equipped with code information 1 (in the form, for example, of bar codes) are stacked. Arranged adjacent to the paper feeding section 2 is a conveying means 5 for conveying the original sheets P in the paper feeding section 2 one by one, starting with the one at the bottom, to an original reading section 45

In this embodiment, a one-dimensional CCD sensor 47 is used, which is arranged perpendicular to the running direction of the feeding belt 4. Accordingly, in FIG. 7, the image reading section 45 is shown as a point.

Figure 8:
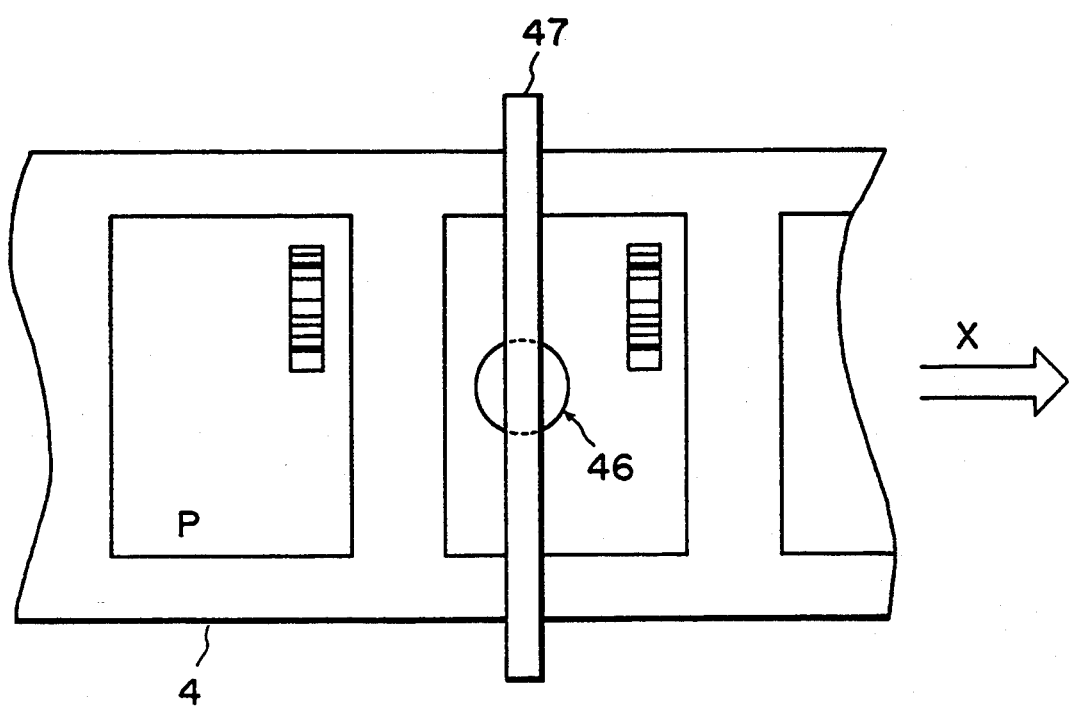
FIG. 8 is a plan view showing the Punning direction of the feeding belt and the arrangement of the CCD sensor in the third embodiment.

FIG. 8 is a plan view showing the running direction of the belt 4 and the arrangement of the CCD sensor 47.

Image formation on the CCD sensor 27 of the image information of one line of the original P is effected by a lens 46.

The conveying means is composed of rollers 3a and 3b, the belt 4 stretched therebetween, and a (reversing) roller 3c which is in contact with the roller 3a. Provided on the downstream side in the feeding direction of the conveying means is a paper discharge stacker 8 in which originals P already read are to be placed.

The original to be read is illuminated by an illuminating lamp 48, and image formation of the image one line of the original is effected on the CCD sensor 47 by the optical lens 46.

The image signal read by the CCD sensor 47 is subjected to operations of A/D conversion, edge emphasis, etc. at a signal processing circuit 50, and the digital image signal obtained at the processing circuit 50 is transmitted by way of a control circuit 51 in the scanner section $A_1$ to a bus line 52.

The data-processing/control unit $B_1$ is also connected to the bus line 52. The control circuit 51 also controls the feeding belt 4.

The data-processing/control unit $B_1$ comprises: a display device 56 which performs a data thinning-out operation on a digital image signal in accordance with a predetermined rule and which displays the thinned-out image; a bit-map memory 53 which temporarily stores the digital image signal; a compression/expansion circuit 57 which compresses or expands the data by a predetermined method (e.g., MH or MR); an optical disc 58 which stores the data which has been compressed or expanded; and a floppy disc 59 each of these components being connected to the bus line 52.

Further, connected to the bus line 52 are a data extraction unit 54 which extracts a signal which appears to be a bar code signal out of one-line image data and a data decoder 55 which analyzes bar codes.

Further, provided in the lines respectively connecting the bus line 52 to the bit-map memory 53, the data extraction unit 54, and the data decoder 55 are switches SW1, SW2 and SW3, which are adapted to change positions through mode selection.

The main control over the entire system is effected by a microprocessor MPU 60.

When the operator designates at the keyboard a first mode or optical disc recording mode, the MPU 60 turns ON the switch SW1 and turns OFF the switches SW2 and SW3, with the bit-map memory being connected to the bus line 52. These switches need not be physical ones; they may also be of a logical character.

With this system configuration, original images which have been read are temporarily stored in the bit-map memory 53. When the reading of one original sheet has been completed, the data obtained thereby is compressed by the compression/expansion circuit 57, the compressed data being recorded on the optical disc 58. Meanwhile, the digital image signal is subjected to a predetermined thinning out process (e.g., at the rate of two pixels to one), the image being displayed on a display device 56 equipped with a keyboard.

When the operator designates at the keyboard a second mode or index file forming mode, the MPU 60 turns OFF the switch SW1 and turns ON the switches SW2 end SW3, with the data extraction unit 54 and the data decoder 55 being connected to the bus line 52.

In this mode, the image data recorded on the optical disc 58 is read out and subjected to data expansion at the compression/expansion circuit 57. Then, it is stored in the bit-map memory 53 and transferred to the data extraction unit 54. When the data extraction unit 54 detects among the digital signals a signal which appears to be a bar code signal, the signals from that time to the rear end of one line are transmitted to the bar code decoder 55, where they are subjected signal analysis.

Here, a signal which appears to be a bar code signal is such as explained with reference to the first embodiment. These operations are repeated line by line, and, when the same data has been detected a predetermined number of times, it is kept as read-out data.

When the data transfer for one frame has been completed, the data stored in the decoder 55 is also recorded on the disc 58 as index data.

In some cases, the index file is recorded on the optical disc on which the images are recorded, thus performing a unitary data management. In other cases, it is recorded on some other medium (e.g., a floppy disc 59).

The quantity of the index data is far smaller than that of the image data, so that a plurality of image discs can be managed with a single index data disc.

The control over the entire system is effected by a control circuit 60, which usually consists of a microcomputer.

The second mode may be automatically executed after the completion of the first mode, independently of the operator's instructions.

Figure 9A:
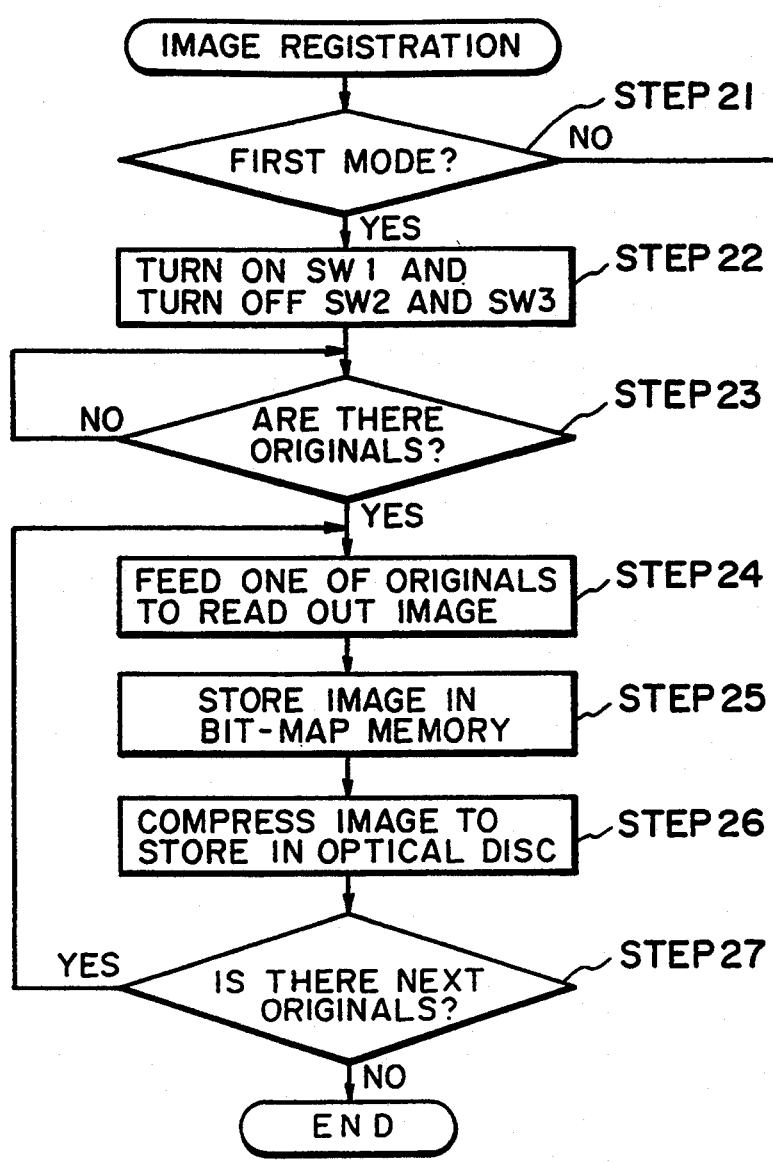
FIG. 9 is a flowchart showing the image registering operation in the third embodiment.
Figure 9:
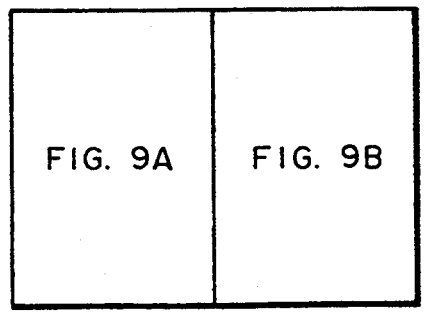
Figure 9B:
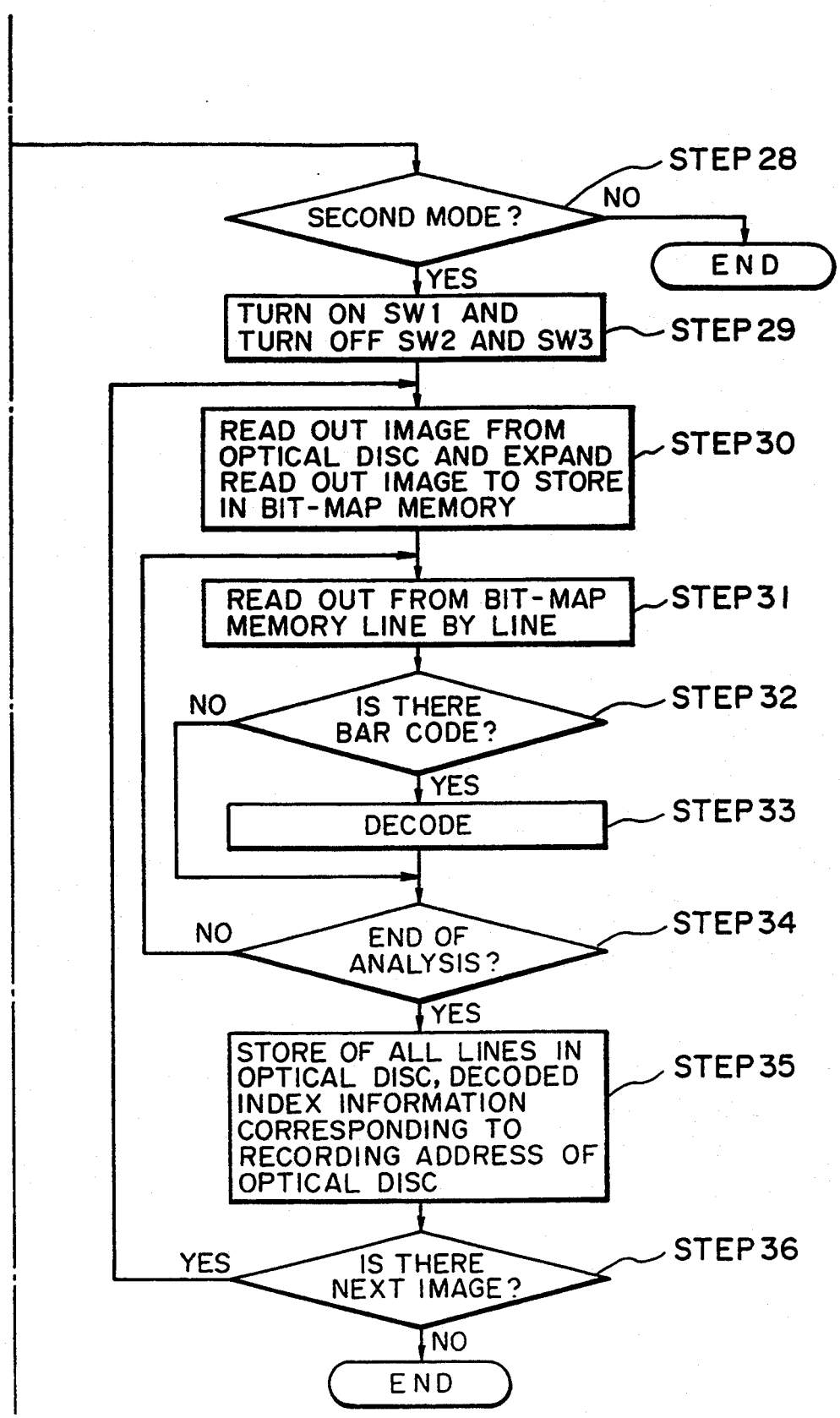

Next, the above image registering operation will be described with reference to FIG. 9.

First, when the operator designates the first mode at the keyboard (Step 21), the switch SW1 is turned ON, and the switches. SW2 and SW3 are turned OFF (Step 22). Then, a judgment is made as to whether there are originals in the paper feeding section 2 of the scanner section $A_1$ or not (Step 23). If there are originals, the feeding means is operated to feed the original at the bottom, whose image is read by the CCD sensor 47 (Step 24) and stored in the bit-map memory 53 (Step 25). Then, the image data is read line by line from the bit-map memory 53 and compressed at the data compression circuit 57 before it is recorded on the optical disc 58 (Step 26). When the recording of image date of one page has been completed, a judgment is made as to whether there is a next original or not (Step 27). If not, the operation is ended, and if there is one, the procedures from Step 24 are performed again.

When the operator designates the second mode (Step 28), the switch SW1 is turned OFF and the switches SW2 and SW3 are turned ON (Step 29). Subsequently, image data for which no index file has been formed yet is read out from the optical disc and expanded by the data compression circuit before it is stored in the bit-map memory 53 (Step 30). Then, the image data is read out line by line from the bit-map memory 93 and transmitted to the data extraction unit 54 (Step 31). A judgment is made in the data extraction unit 54 as to whether there is a bar code pattern in one line data or not (Step 32). If there is, the data is transmitted to the decoder 55, where it is analyzed (Step 33). Then, the operation is repeated until the data extraction has been completed for the data of all lines (Step 34). The system may be so arranged that the procedure moves on to the next step, i.e., Step 35, if the analysis of the same bar code pattern has been performed for several consecutive lines. In Step 35, the index file indicating the correspondence of the storage address of the image read out from the optical disc to the index data obtained from the analyzed bar code, is recorded on the optical disc 58 (Step 35), repeating the operation until there is no image data for which no index file has been formed. If no bar code pattern has been detected, a display to that effect may be given on the CRT 56, demanding the entering of index data at the keyboard. This applies to the other embodiments.

Further, if there is no original in Step 27, the procedure may move on to Step 29, as stated above.

Thus, after reading original documents produced in greet quantities and recording images on a recording medium, the recorded images are read out to extract index information therefrom for the purpose of automatically preparing an index file, thus realizing a substantial rationalization through high speed photographing and unmanned medium change.

Further, index information is not recognized by directly scanning an original but from a signal which has undergone a digital image processing, so that the data recognition can be effected with accuracy. Moreover, there is no need for a special option device, thus realizing an economical system.

In the above embodiments, the data of each line is scanned so as to detect a bar code pattern. This method may take a lot of time when bar code patterns have to be detected out of great quantities of originals. In view of this, the places where the bar codes are provided may be previously indicated, as described below.

The fourth embodiment allows the application of the system configuration shown in FIG. 7. In this embodiment, the images of partition papers on which information indicative of the bar code positions is provided are registered in the optical disc 58 or the floppy disc 59, and partition paper image selection is performed when forming an index file.

FIGS. 10A and 10B show displays on the CRT when the registration or selection of partition papers is performed.

In the following, the operations of registering partition papers, recording originals, and automatically preparing an index file, will be described.

First, to resister partition papers, the operator designates, at the keyboard, a partition paper registration mode to set the apparatus to this mode. When set to the partition paper registration mode, the apparatus displays, on the CRT 56, the patterns of the partition papers already registered, as shown in FIG. 10A. In the example shown in FIG. 10A, ① through ⑤ denote patterns already registered. When, in this condition, the operator selects the position of ⑥ and sets the partition paper shown in FIG. 11 in the paper feeding section 2 so as to execute the registration, the control unit 51 causes the partition paper to be conveyed, with its image being read photoelectrically by the CCD 47. The binary image data is then supplied to the bus 52, and the MPU 60 causes it to be compressed by the data compression/expansion circuit 57 and to be recorded on the opto-magnetic disc 58 as the registered image of the partition paper. Then, the binary image data is condensed through a predetermined thinning-out process and written at that address in the bit-map memory corresponding to ⑥. In this way, the image of the partition paper is registered and displayed as shown in FIG. 10B.

When recording originals as shown in FIGS. 12A and 12B (hereinafter referred to as originals a and b) on the optical disc 58, the operator designates, at the keyboard, a partition paper selecting mode to set the apparatus to this mode. When the apparatus is set to the partition paper selecting mode, the MPU 60 reads out, from the opto-magnetic disc 58, the already registered partition papers and condenses them through a predetermined thinning-out process before writing them to the bit-map memory 53. As a result, a display as shown in FIG. 10B is given. When recording the original a on the optical disc 58, the operator selects, at the keyboard, the partition paper pattern ① indicating the bar code position of the original. Afterwards, the operator designates, at the keyboard, an image registration mode, setting the apparatus to this mode. Then, he sets the original a in the paper feeding section 2, the image thereof being read. The control unit 51 causes a motor (not shown) to be driven so as to convey the original a, the image thereof being read by the CCD 47 and supplied to the bus 52 as binary image data. The MPU 60 stores the binary image data in the bit-map memory 53 and causes it to be compressed by the data compression circuit 57 and to be recorded on the opto-magnetic disc 53 after being Joined with the (already compressed) image data of the selected partition paper. When further registering a new original having a bar code at the same position as the original a, image registration may be performed after setting the new original in the paper feeding section 2. When an original having a bar code at a different position, like the original b, is further to be registered, image registration may be preformed after designating the partition paper selecting mode at the keyboard to set the apparatus to this mode and selecting the new partition paper ⑧.

Next, to be described will be the operations of obtaining index information from the images registered on the optical disc 58 by the above procedures end preparing an index file on the basis of this index information. The operator designates, at the keyboard, an index file forming mode, setting the apparatus to this mode. The MPU 60 reads, out of the opto-magnetic disc 58, an original image of which no index file has been prepared yet and to which a partition paper image has been imparted. Then, the partition paper image and the original image are separated from each other, and the original image is written to the bit-map memory 53 after being expanded by the data compression/expansion circuit 57. Subsequently, while expanding the partition paper image by the data compression circuit 57, the address of the black region in the image is detected as bar code position information. The image on the bit-map memory 53 corresponding to the detected address is transferred to the data extraction unit 54, where a bar code pattern is extracted from the image, the extracted pattern being transferred to the decoder 55. The decoder 55 then performs decoding on the bar code pattern transferred from the data extraction unit 54 before transmitting it to the MPU 60. Upon receiving the index information, the MPU 60 registers it in the index file along with the storage address of the original image. The MPU 60 performs this operation on each of the recording images of which no index has been registered yet, thus automatically forming an index file. When all the images have been registered, the apparatus is restored to the initial condition.

Figure 13A:
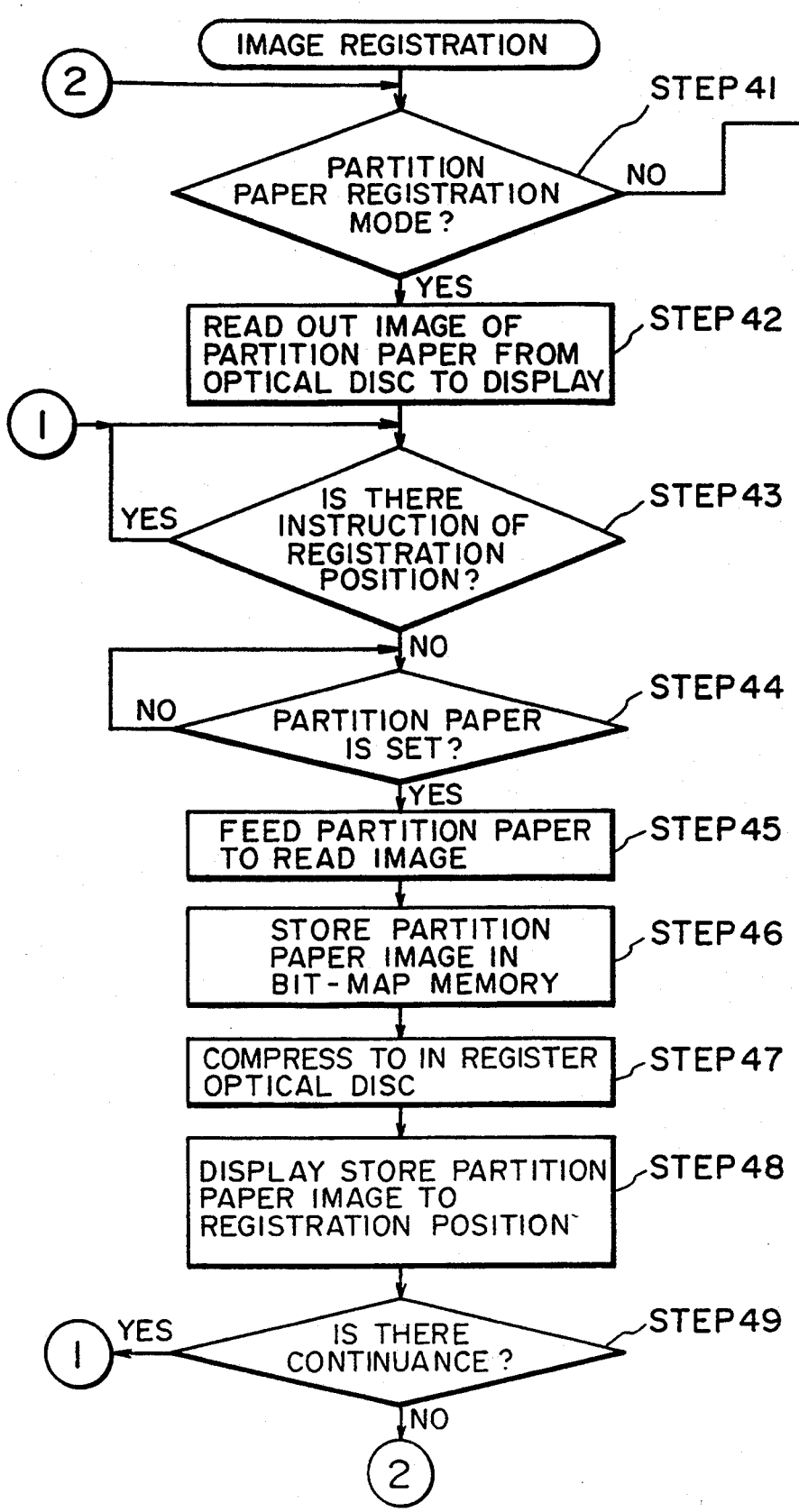
FIG. 13 is a flowchart showing the image registering operation in a fourth embodiment of the present invention.
Figure 13B:
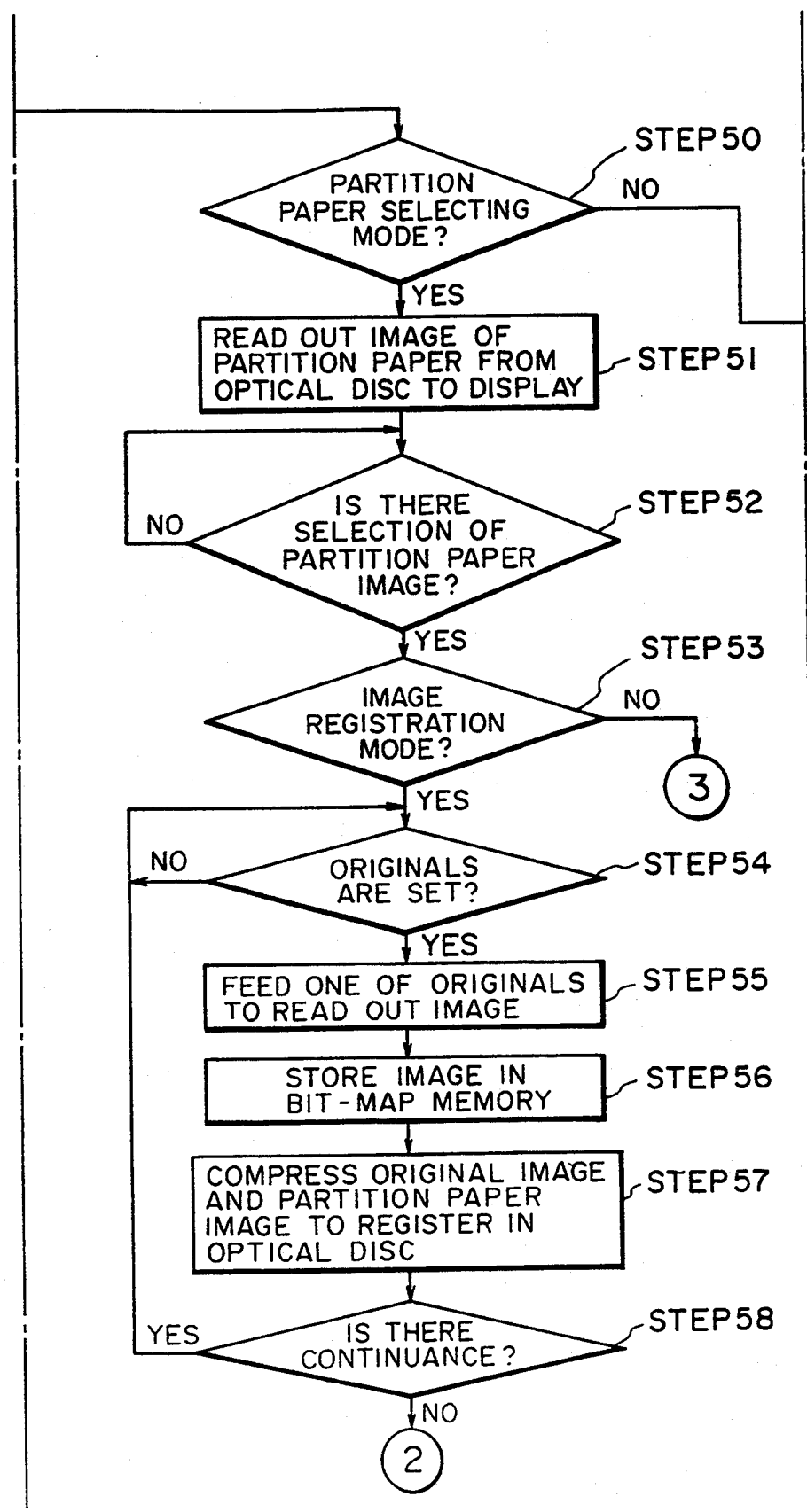
Figure 13:
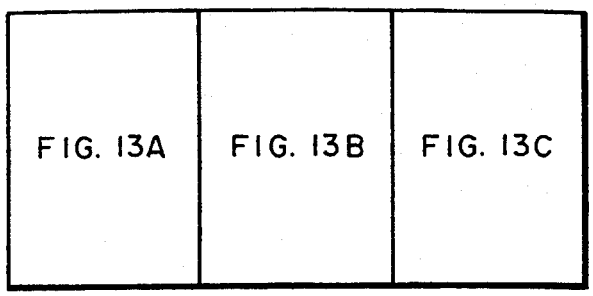
Figure 13C:
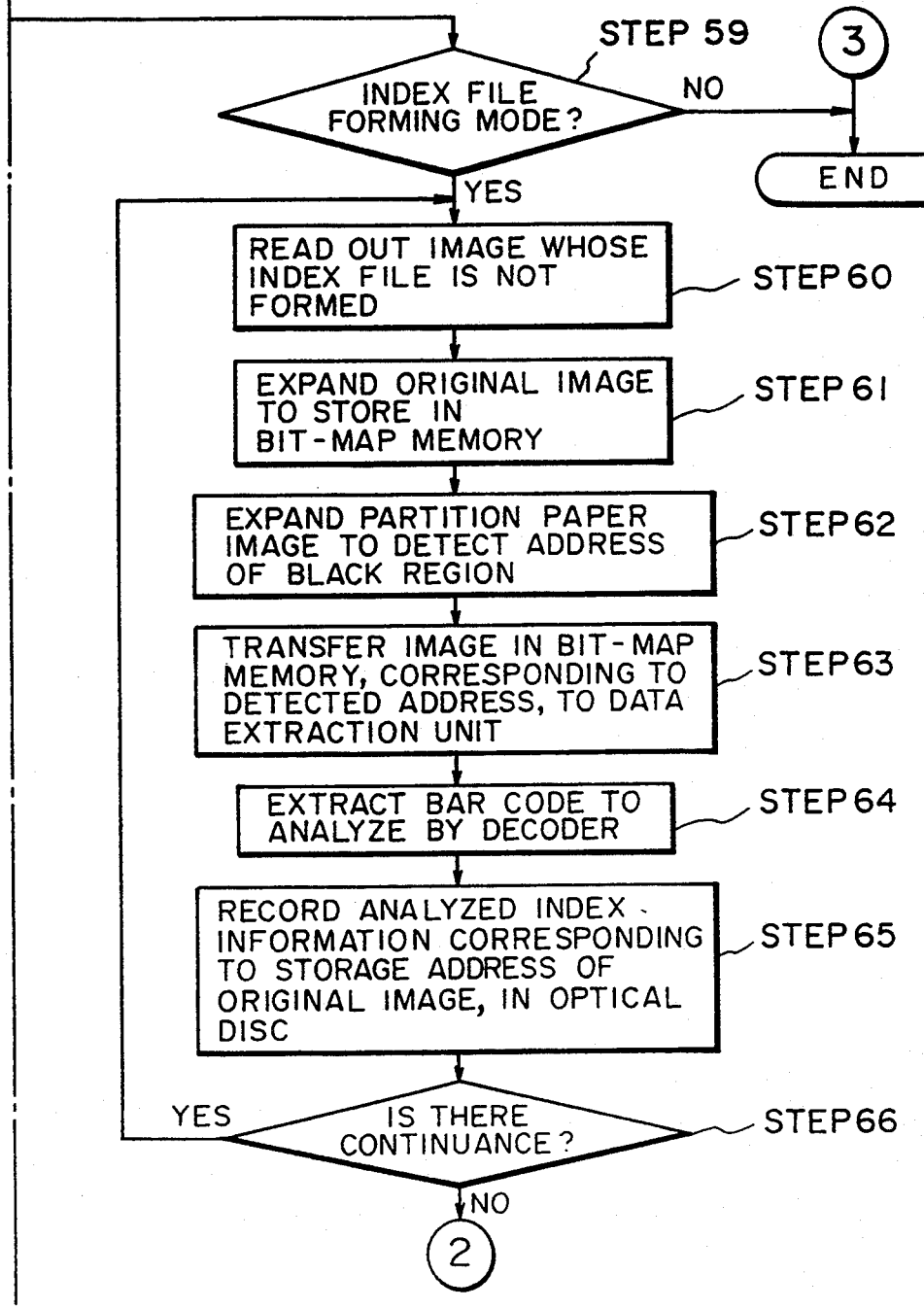

Next, the above image registering operation will be described with reference to the flowchart of FIG. 13. First, designation of any mode by the operator at the keyboard is identified (Steps 41, 50 and 59). When the partition paper registration mode is designated, the image of the partition paper pattern is read out from the optical disc 58 and displayed on the CRT (Step 42). When the operator specifies the registering position of a new partition paper (Step 43), a judgment is made as to whether partition papers have been set in the paper feeding section 2 or not (Step 44). When partition papers have been set, one of the partition papers is fed, its image being read (Step 45) and stored in the bit-map memory 53 (Step 46). Then, the partition paper image is read out line by line from the bit-map memory 53, compressed by the data compression circuit 57 (Step 47), and registered in the optical disc 58 (Step 48). Then, the partition image registered at the registration position designated by the operator is displayed (Step 49), and the procedures from Step 43 onward are performed again if there is a next partition paper.

When the partition paper selecting mode is designated, the partition paper images are read out from the optical disc 58, stored in the bit-map memory 53, and, at the same time, displayed on the CRT (Step 51). When one of the partition images is selected by the operator (Step 52), a judgment is made as to whether or not the image registration mode has been designated by the operator (Step 53). When the image registration mode has been designated, a judgment is made as to whether or not originals have been set in the paper feeding section 2 (Step 54). If originals have been set, one of them is fed, its image being read (Step 55) and stored in the bit-map memory 53 (Step 56). Then the original image end the partition paper image are respectively compressed; the partition paper image is added to the original image before they are registered in the optical disc 58 (Step 57). If there is a next original, the procedures from Step 55 onward are performed again.

When the index file forming mode is designated, an image for which no index file has been formed yet is read out from the optical disc on the basis of the management data, etc. of the optical disc, etc. (Step 60), expanded by the data compression circuit 57, and stored in the bit-map memory 53 (Step 61). Then, the address of the black region of the partition paper image imparted to the original image is detected (Step 62), and that original image of the bit-map memory corresponding to the detected address is transferred to the data extraction unit 54 (Step 63). The image data thus transferred ought to contain a bar code. Thus, the data extraction unit 54 detects a bar code pattern, which is analyzed by the decoder 55 (Step 64). Then, the analyzed index information and the storage address of the original image, in correspondence with each other, are stored in the optical disc (Step 65). The partition paper image added to the original image may be erased. If there still exist images of which no index file has been formed yet, the procedures from Step 60 onward are repeated.

While in the above image registration mode the compressed original image is registered in the optical disc 58 after imparting thereto the compressed partition paper image, it is also possible to detect the address of the black portion of the partition paper when reading out the partition paper image in the partition paper registration mode and record it in correspondence with the storage address of the original image on the optical disc as information indicative of the bar code position when registering the original image, extracting, in the index file forming mode, the original image on the basis of the compressed original image and the bar code position information and transferring it to the data extraction unit 54.

Further, to confirm, in the above embodiment, as to whether the partition paper selected by the operator agrees with the position on the original where the index information exists, the image read in the image registration mode may be stored in the bit-map memory 53, and, when displaying it on the CRT 56 in accordance with the instructions entered at the keyboard, only that image on the bit-map memory 53 which is at the position designated through the partition paper may be displayed by bit-inverting or flashing the same.

Figure 14:
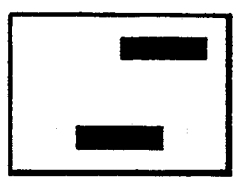
FIG. 14 shows a partition paper.
Figure 15:
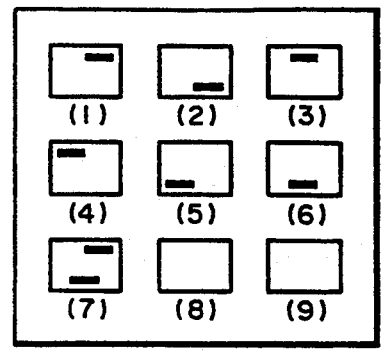
FIG. 15 shows an example of partition paper display.

In the above embodiment, only one bar code exists on a single original. In the case when there exist a plurality of bar codes on a single original, a partition paper which has a plurality of black regions indicating bar code positions, as shown in FIG. 14, may be registered in the partition paper input mode. Further, in a case when the effect of preparing a new partition paper can be obtained by combining a plurality of already registered partition papers with each other, the operator selects a plurality of partition papers to be combined and designates the address where the combined partition paper is to be registered, thereby preparing a new partition paper. That is, when registering the partition paper of FIG. 14, the operator first sets, in the condition of FIG. 10B, a partition paper combining mode through an input operation at the keyboard. Afterwards, he selects the patterns ①and ⑥ as the components for the combination and the pattern ⑦ as the object of the combination. The resulting registration condition is as shown in FIG. 15, with ⑦ becoming available for use like ① and ⑥. Further, the partition paper registration can be erased or the display position of the partition paper can be changed through an input operation at the keyboard.

Figure 16A:
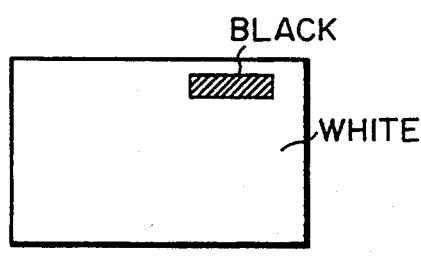
FIGS. 16A and 16B are diagrams showing partition papers.
Figure 17A:
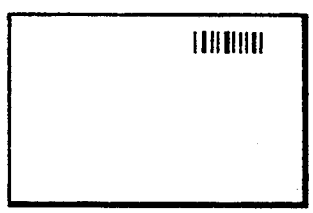
FIGS. 17A and 17D are diagrams showing originals equipped with a bar code.
Figure 17B:
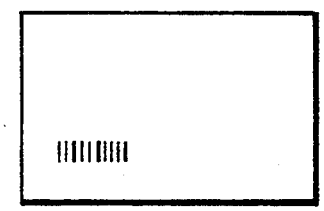
Figure 18A:
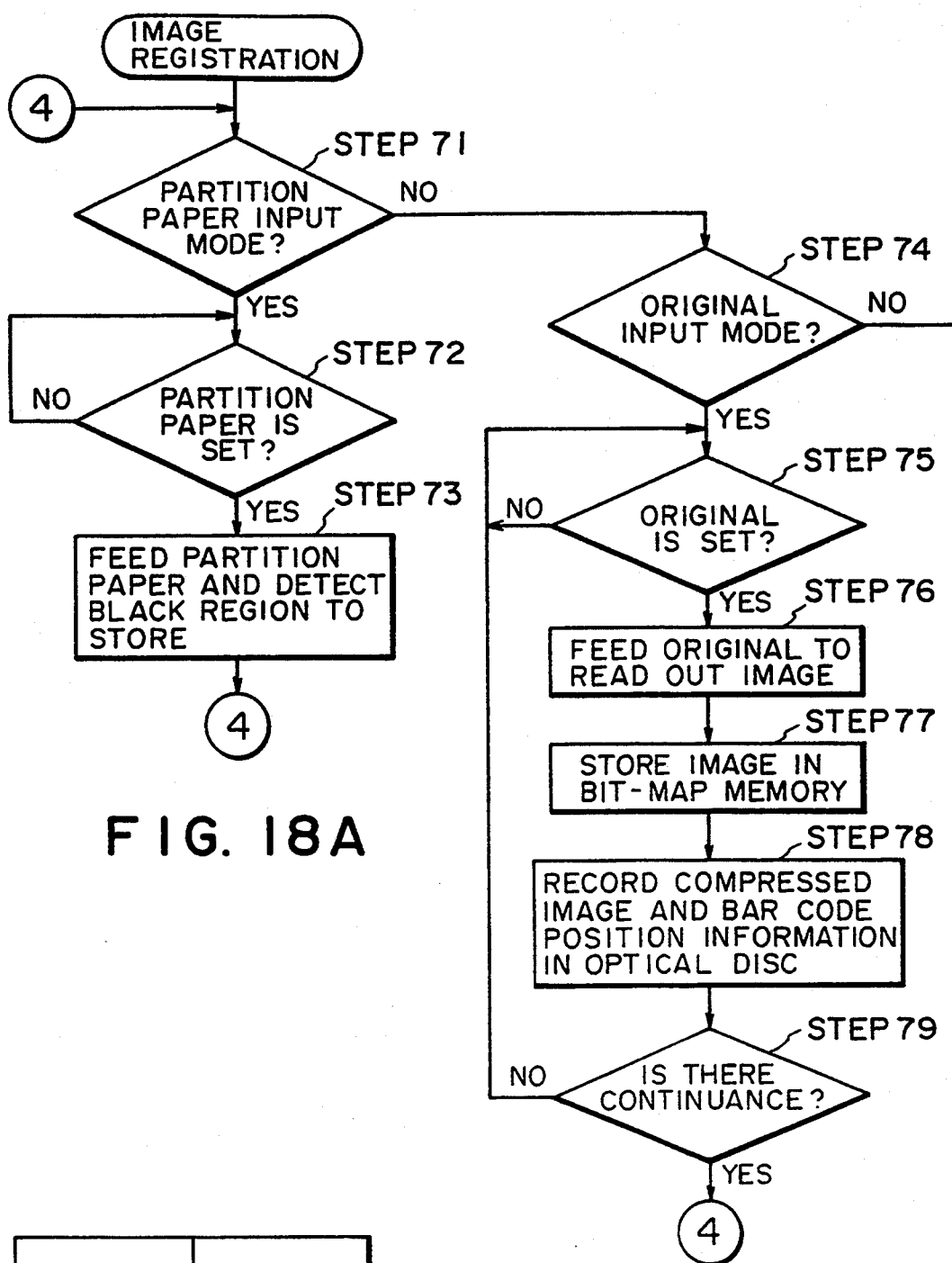
FIG. 18 is a flowchart showing the image registering operation in a fifth embodiment of the present invention.
Figure 18:
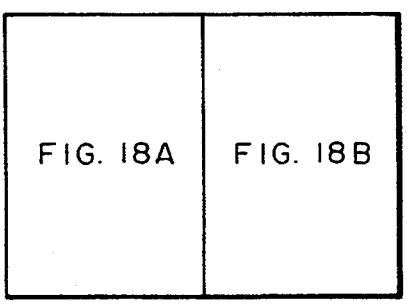
Figure 18B:
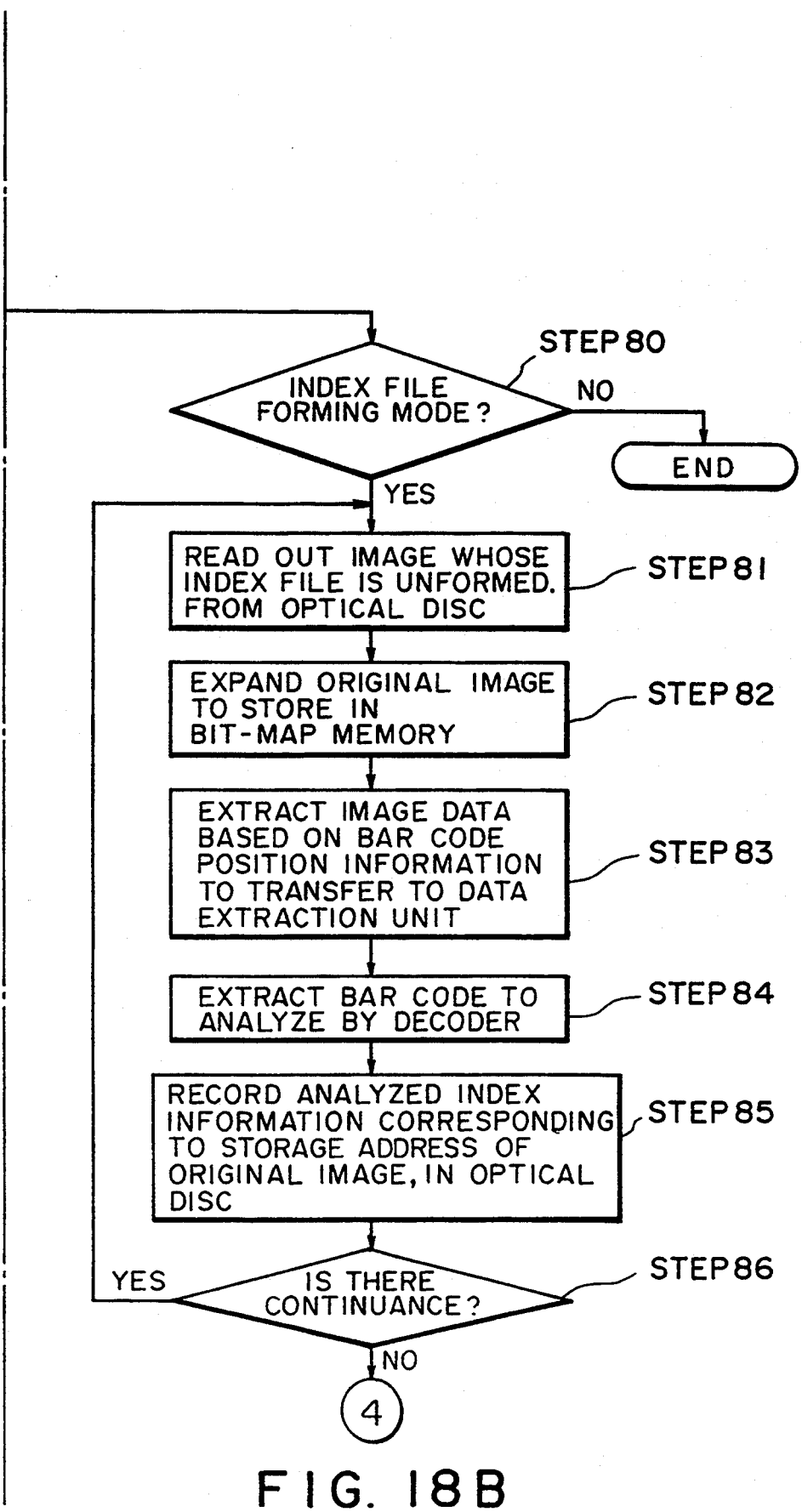

Further, while in the above embodiment the partition paper patterns are previously registered on the optical disc in the partition paper input mode and a desired partition paper pattern is selected from the optical disc in the partition paper selecting mode, it is possible, as in the following embodiment described with reference to FIGS. 16 to 18, not to register the partition paper on the optical disc.

Figure 16B:
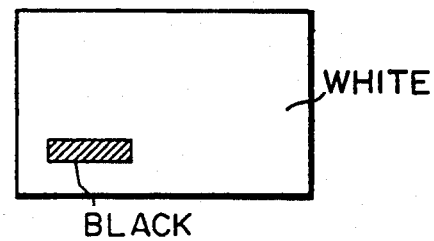

When registering an original image on the optical disc, the operator first sets the apparatus to the partition paper input mode (Step 71), setting, in the paper feeding section 2, a partition paper (FIG. 16A) having a black region at the same position as the bar code imparted to the original to be registered (FIG. 17A) (Step 72). When set in the paper feeding section 2, the partition paper is fed, and the position of the black region on the partition paper is detected while reading the image of the partition paper, storing it in the memory in the control unit 60 (Step 73). Next, when the apparatus is set to the original input mode (Step 74), a judgment is made as to whether originals have been set in the paper feeding section 2 (Step 75). If originals have been set, one of them is red, its image being read and stored in the bit-map memory 53 (Step 76). Then, the image data is read out line by line from the bit-map memory 53, compressed by the data compression circuit 57, and stored in the optical disc 58 (Step 78). In this process, the bar code position information stored in the partition paper input mode is recorded on the optical disc 58 in correspondence with the storage address of the image data. When further registering an original having a bar code at the same position as the previous one, the procedures from Step 75 onward are performed again. When further registering an original having a bar code at a different position from that of the previous one, the apparatus is set to the partition paper input mode again, and the partition paper shown in FIG. 16B is set so as to detect the black region thereof. Afterwards, the apparatus is set to the original input mode and the original shown in FIG. 17B is set. Then, procedures similar to the above are performed, the positional information on the newly stored bar code being registered on the optical disc 58 in correspondence with the storage address of the original image.

Subsequently, the apparatus is set to the index file forming mode (Step 80). Then, image data for which no index file has been formed yet is read out from the optical disc (Step 81), expanded at the data compression circuit 57, and stored in the bit-map memory 53 (Step 82). Then, the bar code position information previously recorded on the optical disc is read out, and the image data in the bit-map memory is extracted on the basis of the positional information and transferred to the data extraction unit 54 (Step 83). Then, an index file is formed as in the embodiment shown in FIG. 13 end recorded on the optical disc.

In the above embodiment, a bar code is imparted to each of the original sheets, the bar code position information being recorded for each original sheet on the opto-magnetic disc. In the case when one document consists of a plurality of original sheets, in contrast, only the bar code information on the first original sheet may be recorded on the optical disc, expanding only the first sheet when forming an index file.

Further, while in the above embodiment an opto-magnetic disc is used as the recording medium and the registration of original images and the formation of an index file are performed in the same apparatus, it is also possible, as in the first embodiment, to use a microfilm as the recording medium. In that case, a device for affecting recording on the microfilm and a device for optically reading the microfilm so as to form an index file may be provided separately, and, further, the device for affecting recording on the microfilm may be endowed with a partition paper input mode. In this construction, blip marks for partition papers are imparted to the photographed images of the partition papers so that they may be discriminated from originals. Then, prepared is a microfilm in which partition papers and originals are mixed with each other, and this microfilm is read by the device for forming index files so as to decode the bar codes, thereby forming an index file. If the photographed image to be processed is a partition paper image, the bar code position information indicated by that partition paper is read and utilized is the information on the positions of the bar codes of the photographed images from that image onwards, thus making it possible to automatically form an index file.

Further, in the case when a plurality of bar codes are imparted to a single original, a plurality of positions may be specified by a partition paper, and bar code position information on the plurality of bar codes may be recorded on the optical disc when registering the original image. In that case, decoding is performed on the plurality of positions in the index file forming mode, thus automatically forming an index file.

Next, to be described will be the sixth embodiment, in which, instead of using partition papers, marks which are indicative of bar code positions are imparted to an original.

Figure 19:
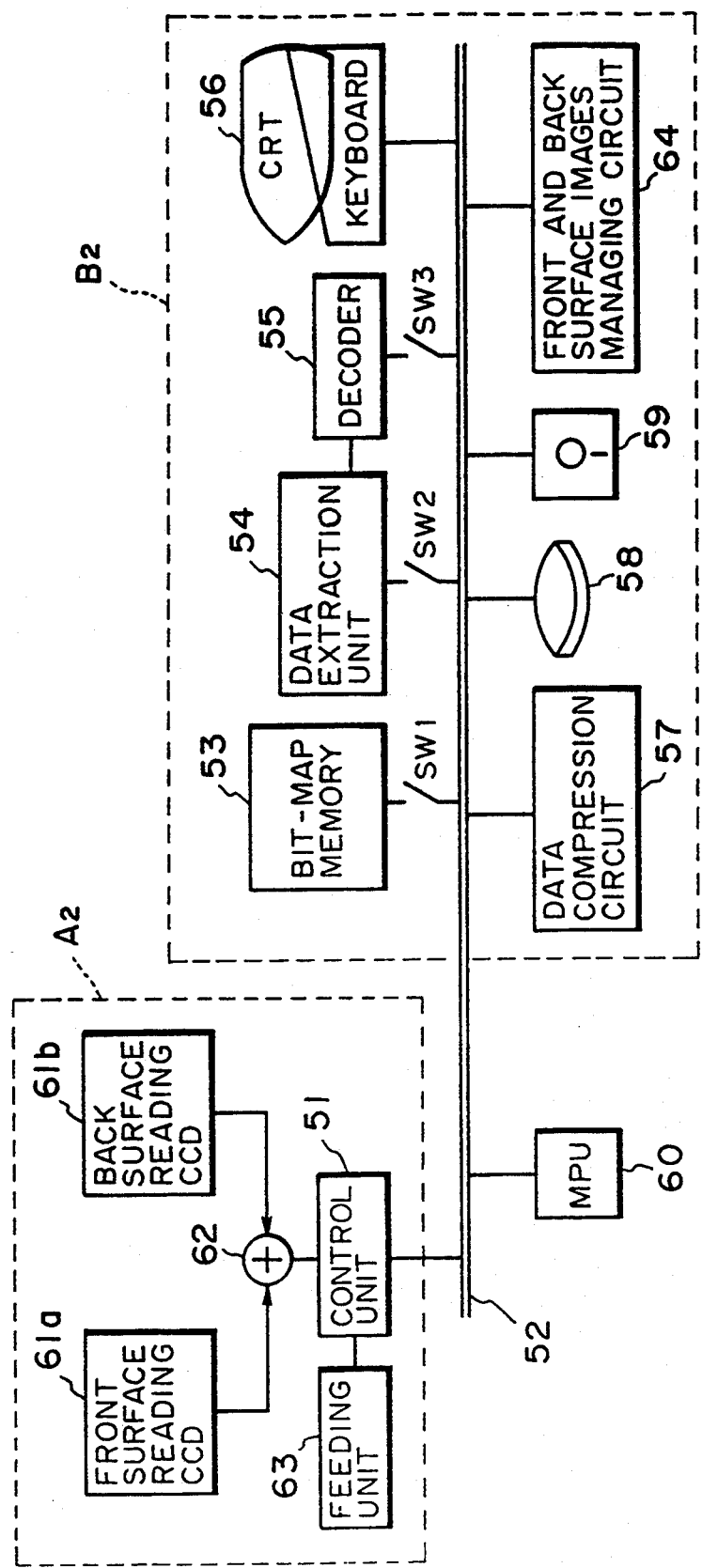
FIG. 19 is a block diagram showing the system configuration of a sixth embodiment of the present invention.

FIG. 19 is a block diagram showing the system configuration of this embodiment. The reference symbols $A_2$ and $B_2$ indicate an image reading section and an image registering section, respectively. The image reading section $A_2$ of this embodiment is so constructed as to be capable of reading the images on the front and back sides of an original. The reference numerals 61a and 61b respectively indicate a CCD for reading the front surface of an original and a CCD for reading the back surface of the same. The reference numeral 62 indicates a synthesizing circuit for synthesizing analog images from the CCDs 61a and 61b into a single signal. This synthesizing circuit consists of an analog switch. The reference numeral 51 indicates a control unit, which, as in the above-described embodiments, performs the operations of transforming analog image data into digital image data, image processing for picture quality improvement, etc. The reference numeral 63 indicates a feeding unit which separates and conveys originals. The image registering section $B_2$ is substantially the same as in the above embodiment except for the fact that a front and back surface images managing circuit 64 is added thereto, which selects between batch output and separate output of the image data of the front surface and that of the back surface of an original.

Figure 20:
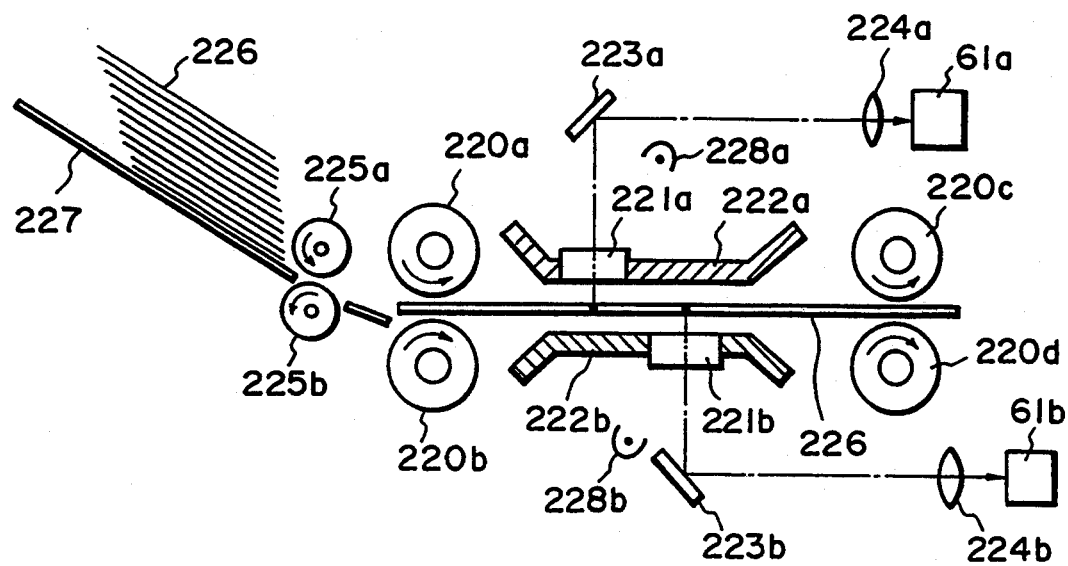
FIG. 20 is a sectional view showing the construction of an image reading section.

FIG. 20 is a sectional view showing the construction of the image reading section, which includes a paper feeding section 227 in which originals are stacked, a pair of separating rollers 225a and 225b for separating the originals stacked in the paper feeding section 227 into individual sheets starting with the one at the bottom, feeding rollers 220a to 220d, feeding guides 222a and 222b for feeding originals, reading glasses 221a and 221b arranged at the original reading positions, reflecting mirrors 223a and 223b, image forming lenses 224a and 224b, and exposure lamps 228a and 228b for illuminating the front and back surfaces of an original.

Figures 21A, 21B:
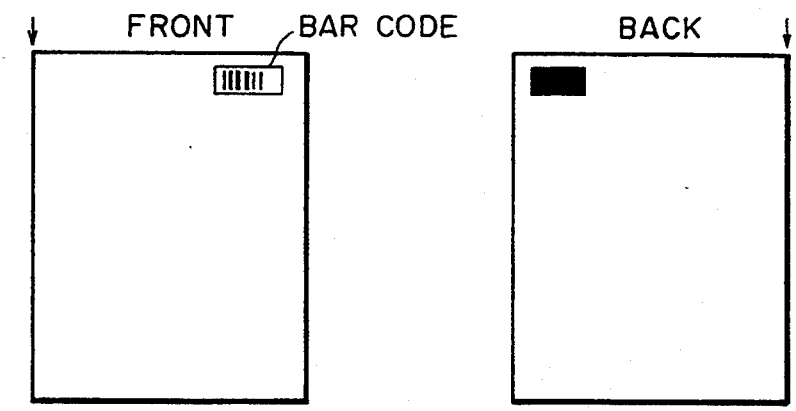
FIGS. 21A and 21B are diagrams showing the front and back sides of an original sheet.

In this embodiment, a bar code is provided on the front surface of an original and a mark (a black image) indicating the bar code position is provided on the back surface of the same, as shown in FIGS. 21A and 21B. The black image is positioned directly on the other side of the bar code with respect to the original sheet. This mark may, as in the above embodiment, consist of a black frame instead of a black image.

Figure 22A:
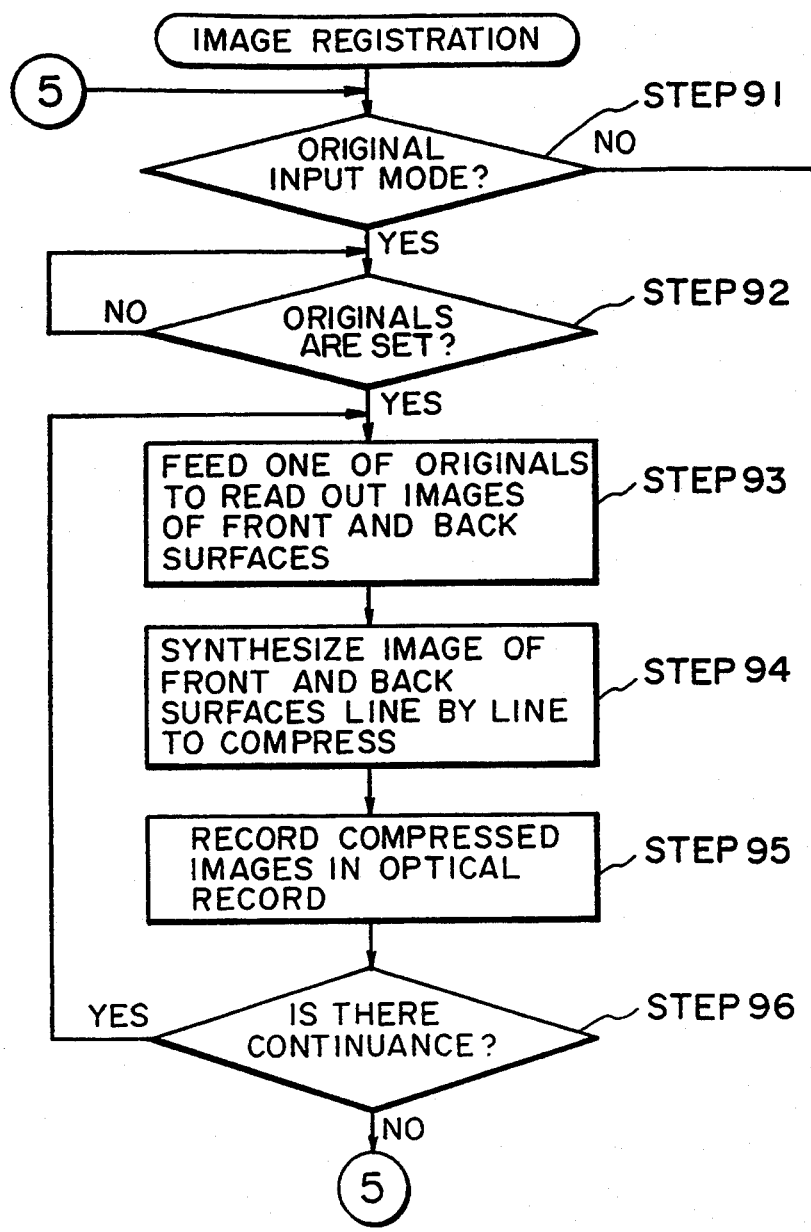
FIG. 22 is a flowchart showing the image registering operation in a sixth embodiment of the present invention.
Figure 22:
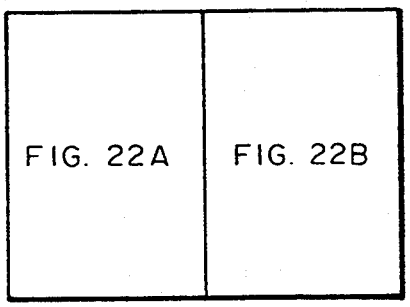
Figure 22B:
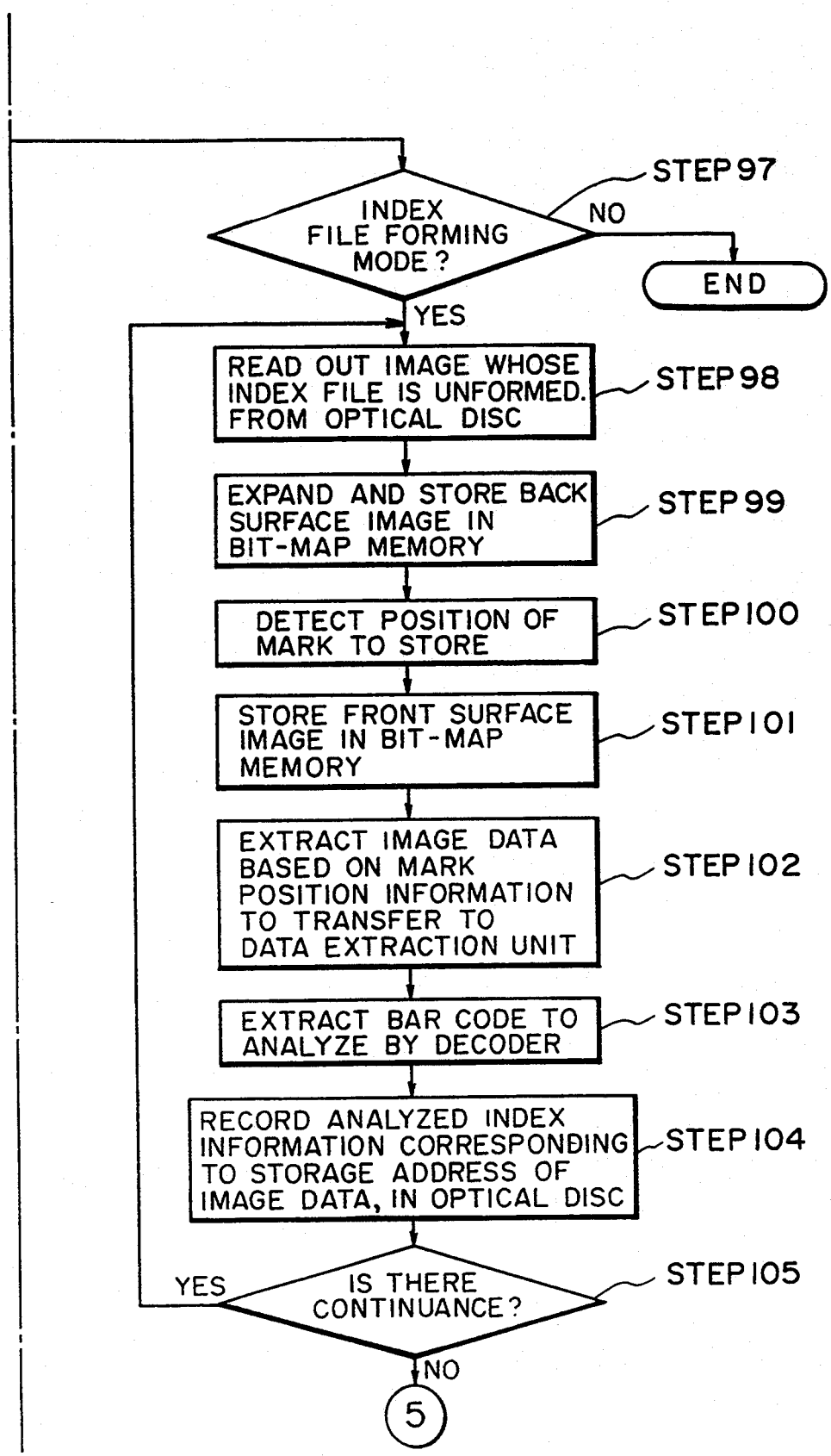

Next, the operation of the apparatus of this embodiment will be described with reference to FIG. 22.

Figure 23:
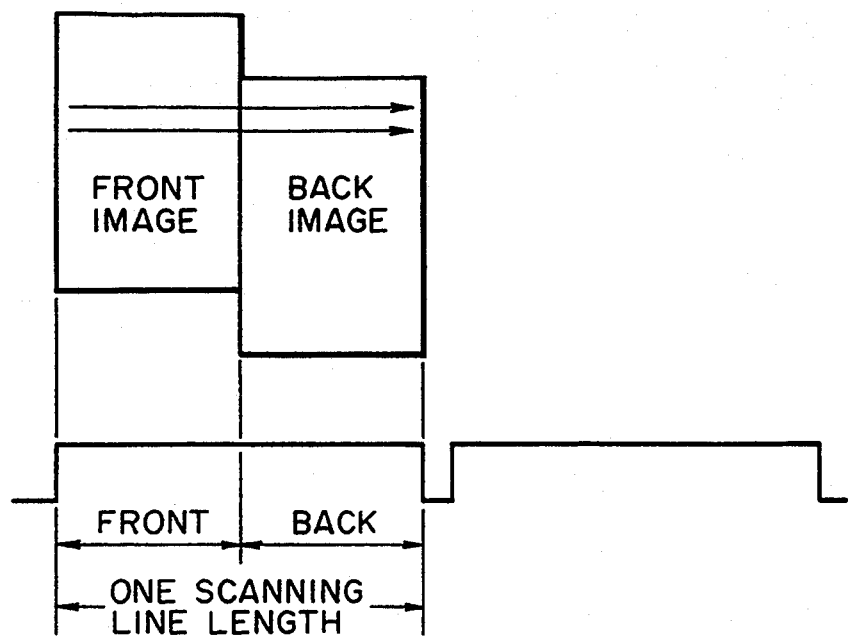
FIG. 23 shows how the image data on the front side of an original is combined with the image data on the back side of the same.

First, the operator Judges whether the original input mode or the index file forming mode has been designated (Steps 91 and 97). If the original input mode has been designated, a judgment is made as to whether originals are set in the paper feeding section 227 or not (Step 92). If originals are set, the separating rollers 225a and 225b and the feeding rollers 220a to 220d are operated so as to feed one of the originals. Then, the images on the front and back surfaces of the original are respectively read out by the CCDs 61a and 61b (Step 93). Then, as shown in FIG. 23, the image data on the front surface and the image data on the back surface are synthesized and binary-coded line by line. The data is then compressed by the data compression circuit 57 (Step 94) and sequentially recorded on the optical disc 58 (Step 95). As shown in FIG. 23, the image data of the front surface is output earlier than the image data of the back surface. In view of this, the front surface image data is delayed. Then, the recording on the optical disc is performed until there are no originals stacked in the paper feeding section 227 (Step 96).

When the index file forming mode is designated, image data for which no index file has been formed yet is read out from the optical disc (Step 98) and expanded by the data compression circuit 57. Further, back surface image data is extracted by the front end back surface images managing circuit 65 and stored in the bit-map memory 53 (Step 99). Then, the position of a black image mark is detected out of the image data stored in the bit-map memory 53, transformed into bar code position information on the original front surface, and stored in the memory in the MPU 60 (Step 100). Subsequently, the same image data is read out from the optical disc again end expanded. Further, front image data is extracted by the front and back surface image managing circuit 65 and stored in the bit-map memory 53 (Step 101). If the bit-map memory has a capacity for two screens, the front and back surface image managing circuit 65 is not necessary. Then, on the basis of the bar code position information previously stored, image data is extracted from the bit-map memory 53 and transferred to the data extraction unit 52 (Step 102). The data extraction unit 54 extracts out of the transferred image data a bar code pattern, which is analyzed by the decoder 55 so as to obtain index information (Step 103). Then, an index file, in which the index information obtained is in correspondence with the storage address of the image data, is recorded on the optical disc (Step 104). These operations are repeated until there is no data for which no index file has been formed yet (Step 105).

In the case when a reloadable optical disc is used as the recording medium, only the image data of the original front surface may be re-recorded after the formation of an index file. This can be affected by recording only the output of the CCD 61a on the optical disc.

There are many types of originals in use which are equipped with bar codes, and this embodiment can be applied to such originals solely by printing on their back surfaces marks which are indicative of the bar code positions.

Further, it is also possible to detect mark positions while reading the images on the back surfaces of originals in the image reading section $A_2$ and to previously store on the optical disc mark position information in correspondence with the front surface image data. In that case, data may be extracted, in the index file forming mode, from the front surface image data on the basis of the recorded mark position information.

Further, instead of using bar codes as the index information, it is also possible to provide the decoder 55 with an OCR function which enables it to recognize characters. In that case, carbon copying papers may be used as they are, as originals.

Next, an embodiment in which a microfilm is used instead of the optical disc will be described.

Figure 24:
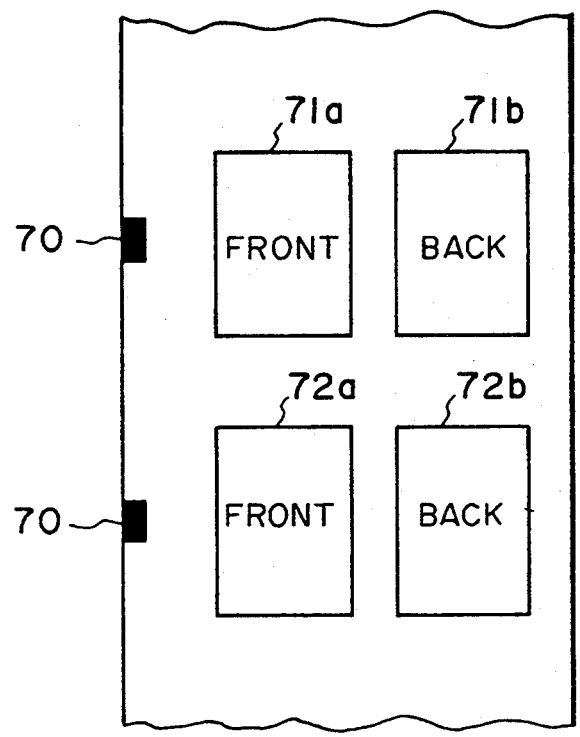
FIG. 24 shows a microfilm.

FIG. 24 shows a microfilm (a duo film) in which frame images of original front surfaces and frame images of original back surfaces are recorded. The reference numerals 71a and 72a indicate images of the front surfaces of originals, the reference numerals 71b and 72b indicate images of the back surfaces of the same, and the reference numeral 70 indicates blip marks indicating the frame image positions.

Figure 25:
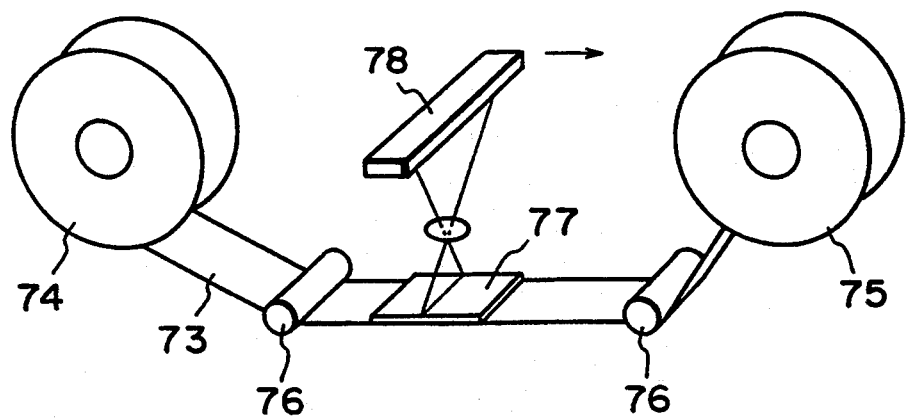
FIG. 25 shows a microfilm reading section.

FIG. 25 shows a microfilm reading section, which includes a delivery reel 74 around which a microfilm 73 is wound, a take-up reel 75 for taking up the microfilm 73, delivery rollers 76 for keeping the microfilm 73 horizontal at the microfilm film reading position, a platen 77 for preventing the images on the microfilm from being blurred, and a CCD 78 for reading images on the microfilm. By moving the CCD 78 in the direction indicated by the arrow, the front and back surface images of originals stored in the microfilm can be read. The back surface image data is stored in the bit-map memory and the mark positions are detected. Then, the front surface images are stored in the bit-map memory and the image data is transferred to the data extraction unit on the basis of the mark position information. Then, as in the above embodiment, an index file is formed and recorded on the floppy disc 59. Alternatively, the front surface image data which has been read and the index file may be recorded on the optical disc.

Figures 26A, 26B:
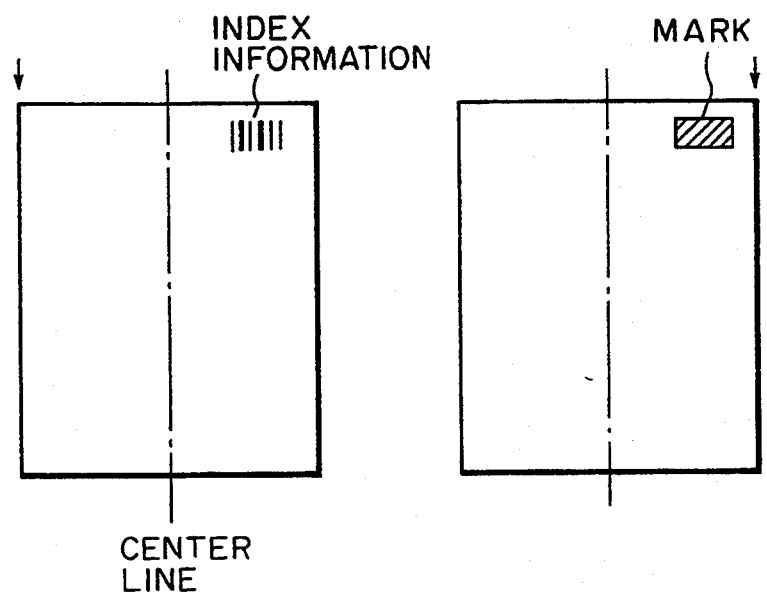
FIGS. 26A and 26B are diagrams showing the front and ba back sides of an original sheet.
Figure 29:
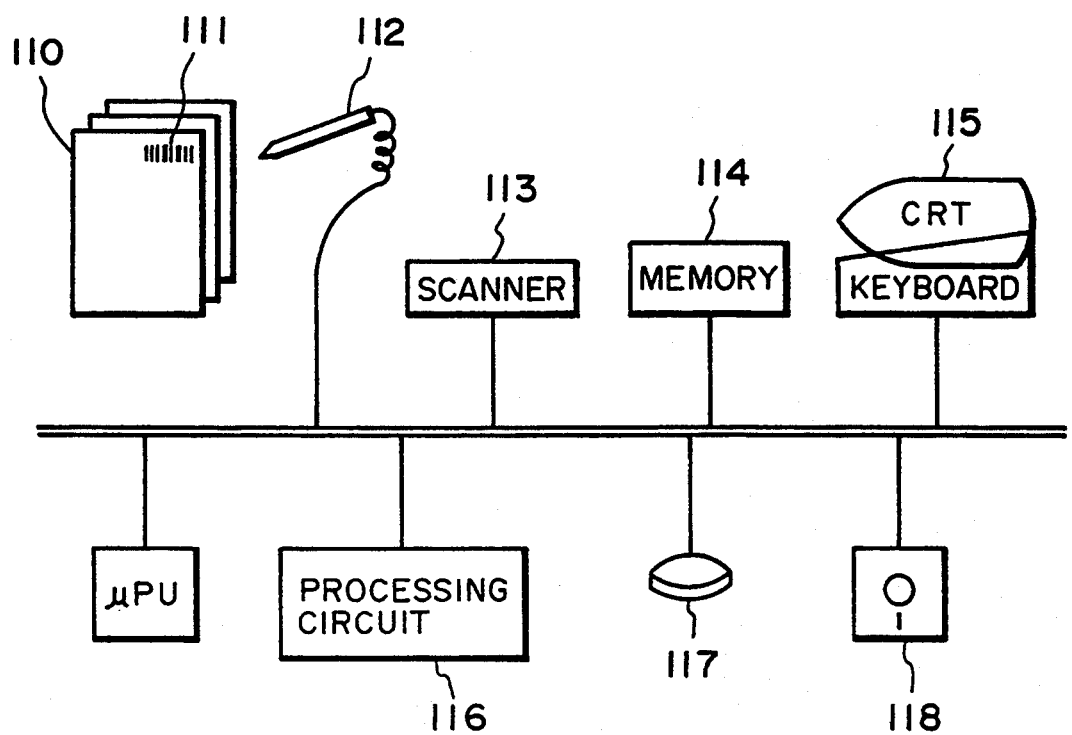
FIG. 29 shows the construction of a conventional image registering apparatus.

Further, as shown in FIGS. 26A and 26B, the marks imparted to the back surface of originals may be at the same positions as the bar codes imparted to the front surfaces of the same.

The present invention is not restricted to the above-described embodiments. Various modifications are possible within the scope indicated by the attached claims.

What is claimed is:

1. An image registering method of recording an image in a recording medium, said method comprising steps of:
    reading an image of an original to which a bar code is added;
    storing the read image of the original in a memory;
    rotating the image stored in the memory by 90 degrees;
    detecting the bar code from the image, which has been rotated, and decoding detected bar code information; and
    forming an index file indicating a relationship between the decoded bar code information and a recording address of the image of the original, which is recorded in the recording medium.

2. A method according to claim 1, further comprising performing said rotating step when a main read-out scanning direction of the image of the original is at right angles with a direction of arrangement of bars of the bar code.

3. A method according to claim 1, further comprising performing said rotating step prior to the bar code information being detected from the image, which is stored in the memory and which is not yet rotated by 90 degrees.

4. A method according to claim 1, wherein the memory is a bit map memory.

5. An image registering apparatus for recording in a recording medium an image of an original to which bar code information is added and which is read by an image reading device, said apparatus comprising:
    a memory for storing an original image to which the bar code information is added;
    processing means for rotating the image stored in said memory by 90 degrees;
    detecting means for detecting the bar code information from the image rotated by said processing means;
    decoding means for decoding the bar code information detected by said detecting means; and
    forming means for generating an index file indicating a relationship between the bar code information decoded by said decoding means and a recording address of the original image recorded in the recording medium.

6. An apparatus according to claim 5, wherein said processing means rotates the image when a main read-out scanning direction of the original image is at right angles with a direction of arrangement of bars of the bar code.

7. An apparatus according to claim 5, wherein said processing means rotates the original image prior to the bar code information being detected from the image, which is stored in said memory and which is not yet rotated by 90 degrees.

8. An apparatus according to claim 5, wherein said memory is a bit map memory.

9. An index file forming method for reading out image information including index information from a storage medium, detecting the index information from the read-out image information and forming an index file representing a relation between the detected index information and a storage address of the storage medium of the image formation, said method comprising steps of:
    detecting the image information to which an index file is not yet formed, from a plurality of image information stored in the storage medium;
    reading out the image information to which the index file is not yet formed, from the storage medium and detecting the index information included in the detected image information; and
    forming the index file on the basis of the index information detected in said reading and detecting steps and the storage address of the image information.

10. A method according to claim 9, further comprising storing the formed index file in the storage medium.

11. A method according to claim 9, wherein the index information included in the image information is a bar code format.

12. A method according to claim 9, further comprising generating a warning when the index information is not detected.

13. A method according to claim 12, wherein said generating step comprises displaying a request of an input of the index information.

14. An index file forming apparatus for reading out image information including index information from a storage medium, detecting the index information from the read-out image information and forming an index file representing a relation between the detected index information and a storage address of the storage medium of the image formation, said apparatus comprising:

first detecting means for detecting the image information to which an index file is not yet formed, from a plurality of image information stored in the storage medium;

second detecting means for reading out the image information detected by said first detecting means, from the storage medium and for detecting the index information included in the read-out image information; and forming means for forming the index file on the basis of the index information detected by said second detecting means and the storage address of the image information.

15. An apparatus according to claim 14, wherein said storage means stores the index file formed by said forming means, in said storage means.

16. An apparatus according to claim 14, wherein the index information included in the image information is a bar code format.

17. An apparatus according to claim 14, further comprising generating means for generating a warning when the index information is not detected by said second detecting means.

18. An apparatus according to claim 17, wherein said generating means displays a request of an input of the index information.

19. A method according to claim 9, wherein the plurality of image information stored in the storage medium comprises image information outputted from an image reading device.

20. An apparatus according to claim 14, wherein the plurality of image information stored in the storage medium comprises image information outputted from an image reading device.

* * * * *

UNITED STATES PATENT AND TRADEMARK OFFICE
CERTIFICATE OF CORRECTION

PATENT NO. : 5,393,962
DATED : February 28, 1995
INVENTOR(S) : Motofumi KONISHI, et al.

Page 1 of 3

It is certified that error appears in the above-indentified patent and that said Letters Patent is hereby corrected as shown below:

<u>COLUMN 1</u>:

Line 13, "Palates" should read --relates--.

<u>COLUMN 2</u>:

Line 8, "reed" should read --read--;
Line 14, "8" should read --a--; and
Line 67, "seep" should read --step--.

<u>COLUMN 3</u>:

Line 39, "are" should read --is--; and
Line 49, "Punning" should read --running--.

<u>COLUMN 4</u>:

Line 20, "ba" should be deleted.

<u>COLUMN 5</u>:

Line 41, "image. 10" should read --image 10--; and
Line 52, "decoder 22," should read --decoder 24,--.

UNITED STATES PATENT AND TRADEMARK OFFICE
CERTIFICATE OF CORRECTION

PATENT NO. : 5,393,962
DATED : February 28, 1995
INVENTOR(S) : Motofumi KONISHI, et al.

It is certified that error appears in the above-indentified patent and that said Letters Patent is hereby corrected as shown below:

COLUMN 6:

Line 27, "fying," should read --fying--;
Line 29, "Searched" should read --searched--;
Line 30, "end," should read --and,--; and
Line 44, "Indicating" should read --indicating--.

COLUMN 8:

Line 34, "section 45" should read --section 45.--.

COLUMN 9:

Line 1, "the-data" should read --the data--;
Line 4, "disc 59" should read --disc 59,--; and
Line 46, "subjected" should read --subjected to--.

COLUMN 10:

Line 27, "memory 93" should read --memory 53--; and
Line 51, "greet" should read --great--.

COLUMN 11:

Line 60, "Joined" should read --joined--.

COLUMN 12:

Line 5, "end" should read --and--.

UNITED STATES PATENT AND TRADEMARK OFFICE
CERTIFICATE OF CORRECTION

PATENT NO. : 5,393,962
DATED : February 28, 1995
INVENTOR(S) : Motofumi KONISHI, et al.

It is certified that error appears in the above-indentified patent and that said Letters Patent is hereby corrected as shown below:

COLUMN 13:

Line 51, "exist" should read --exists--.

COLUMN 14:

Line 27, "red," should read --fed,--; and
Line 42, "Is" should read --is--.

COLUMN 15:

Line 10, "affecting" should read --effecting--.

COLUMN 16:

Line 16, "Judges" should read --judges--.

COLUMN 17:

Line 2, "affected" should read --effected--.

Signed and Sealed this

Eleventh Day of July, 1995

BRUCE LEHMAN

*Attest:*

*Attesting Officer*   Commissioner of Patents and Trademarks